United States Patent
Rodrigues et al.

(10) Patent No.: US 12,030,382 B2
(45) Date of Patent: Jul. 9, 2024

(54) DUAL-SIDED DISPLAY FOR A VEHICLE

(71) Applicant: Toyota Motor Engineering & Manufacturing North America, Inc., Plano, TX (US)

(72) Inventors: Sean P. Rodrigues, Ann Arbor, MI (US); Frederico Marcolino Quintao Severgnini, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 520 days.

(21) Appl. No.: 17/348,254

(22) Filed: Jun. 15, 2021

(65) Prior Publication Data
US 2022/0396148 A1    Dec. 15, 2022

(51) Int. Cl.
*B60K 35/00*       (2006.01)
*B60K 35/22*       (2024.01)
(Continued)

(52) U.S. Cl.
CPC ............ *B60K 35/00* (2013.01); *B60W 40/08* (2013.01); *G06V 20/56* (2022.01); *B60K 35/22* (2024.01);
(Continued)

(58) Field of Classification Search
None
See application file for complete search history.

(56) References Cited

U.S. PATENT DOCUMENTS 8,362,992 B2    1/2013  Kuhlman et al.
9,702,183 B1 *  7/2017  Ochiai ............... B60J 3/007
(Continued)

FOREIGN PATENT DOCUMENTS

JP    H07137589 A   *  5/1995
KR    101737737 B1  *  5/2017   ............... B60R 1/00
(Continued)

OTHER PUBLICATIONS

Firth, "Creating vehicle-to-pedestrian communication using transparent window displays", retrieved from the Internet: <https://e2e.ti.com/blogs_/b/behind_the_wheel/posts/how-to-create-vehicle-to-pedestrian-communication-using-transparent-window-displays>, retrieved Mar. 23, 2023, dated Aug. 1, 2019 (6 pages).

(Continued)

*Primary Examiner* — Fekadeselassie Girma
(74) *Attorney, Agent, or Firm* — Christopher G. Darrow; Darrow Mustafa PC

(57) ABSTRACT

A vehicle can include a window. The window can include an interior side and an exterior side. The vehicle can include a camera operatively positioned to capture visual data of a portion of an exterior environment of the vehicle. The vehicle can include a dual-sided transparent display forming at least a portion of the window. The vehicle can include a processor operatively connected to the camera and the dual-sided transparent display. The processor can be configured to selectively cause the dual-sided transparent display to display exterior visual information on the exterior side. The processor can be configured to cause the dual-sided transparent display to display interior visual information on the interior side. The interior visual information can include the visual data of the portion of the exterior environment of the vehicle.

19 Claims, 8 Drawing Sheets

(51) Int. Cl.
  *B60K 35/28* (2024.01)
  *B60K 35/60* (2024.01)
  *B60K 35/65* (2024.01)
  *B60W 40/08* (2012.01)
  *G06V 20/56* (2022.01)

(52) U.S. Cl.
  CPC .............. *B60K 35/28* (2024.01); *B60K 35/60* (2024.01); *B60K 35/654* (2024.01); *B60K 2360/1526* (2024.01); *B60K 2360/176* (2024.01); *B60K 2360/178* (2024.01); *B60K 2360/785* (2024.01); *B60W 2540/225* (2020.02)

(56) References Cited

U.S. PATENT DOCUMENTS

| | | | | |
|---|---|---|---|---|
| 9,707,913 | B1* | 7/2017 | Ochiai | B60N 2/0248 |
| 9,855,890 | B2* | 1/2018 | James | B60Q 5/006 |
| 9,902,266 | B2* | 2/2018 | Pisz | B60K 35/00 |
| 9,969,265 | B2* | 5/2018 | Williams | B60C 9/00 |
| 10,065,504 | B2* | 9/2018 | Ochiai | B60K 37/06 |
| 10,377,303 | B2* | 8/2019 | McNew | B60W 50/14 |
| 10,449,898 | B2* | 10/2019 | Sherony | G08G 1/166 |
| 10,777,078 | B1* | 9/2020 | Murad | G06V 20/584 |
| 11,089,239 | B1* | 8/2021 | Murad | H04N 23/698 |
| 2003/0210360 | A1* | 11/2003 | Yoshida | G02F 1/13362 |
| | | | | 349/96 |
| 2011/0043496 | A1* | 2/2011 | Ray Avalani | G06T 19/006 |
| | | | | 345/204 |
| 2012/0162427 | A1* | 6/2012 | Lynam | H04N 23/55 |
| | | | | 348/148 |
| 2012/0306940 | A1 | 12/2012 | Machida et al. | |
| 2013/0127980 | A1 | 5/2013 | Haddick et al. | |
| 2014/0019005 | A1* | 1/2014 | Lee | G08G 1/0962 |
| | | | | 701/301 |
| 2015/0360565 | A1* | 12/2015 | Goto | B60R 1/00 |
| | | | | 701/36 |
| 2016/0311323 | A1* | 10/2016 | Lee | G06F 3/013 |
| 2016/0368418 | A1* | 12/2016 | Suenaga | B60R 1/12 |
| 2017/0043720 | A1* | 2/2017 | Shaw | B60Q 9/008 |
| 2017/0297496 | A1* | 10/2017 | Onaka | B60R 1/12 |
| 2018/0015879 | A1* | 1/2018 | Kim | G08G 1/167 |
| 2018/0022278 | A1* | 1/2018 | Parat | B60R 11/04 |
| | | | | 348/148 |
| 2018/0154831 | A1* | 6/2018 | Spencer | H04N 23/90 |
| 2018/0156953 | A1 | 6/2018 | Li | |
| 2018/0268701 | A1* | 9/2018 | Sato | B60Q 9/008 |
| 2018/0330632 | A1* | 11/2018 | Fonarov | A63H 30/04 |
| 2018/0334101 | A1* | 11/2018 | Tschirhart | B60R 1/08 |
| 2019/0009796 | A1* | 1/2019 | Fujii | B60W 40/08 |
| 2019/0315275 | A1 | 10/2019 | Kim et al. | |
| 2020/0111489 | A1* | 4/2020 | Kuramochi | G10L 15/22 |
| 2021/0026057 | A1 | 1/2021 | Meng et al. | |
| 2021/0039522 | A1* | 2/2021 | Bove | B60N 2/0244 |
| 2021/0300404 | A1* | 9/2021 | Bruckmeier | B60K 35/25 |
| 2021/0347374 | A1* | 11/2021 | Stenneth | G01C 21/3655 |
| 2021/0389615 | A1* | 12/2021 | Rodrigues | G02F 1/137 |
| 2021/0394793 | A1* | 12/2021 | Austin | B60Q 1/5037 |
| 2022/0041105 | A1* | 2/2022 | Jochmann | G06T 11/60 |
| 2022/0283432 | A1* | 9/2022 | Richards | B60K 35/50 |
| 2022/0396205 | A1 | 12/2022 | Rodrigues et al. | |
| 2022/0397464 | A1* | 12/2022 | Rodrigues | G02B 5/18 |

FOREIGN PATENT DOCUMENTS

| | | | | |
|---|---|---|---|---|
| TW | 202119805 A | * | 5/2021 | ............ H04N 25/77 |
| WO | 2019201554 A1 | | 10/2019 | |

OTHER PUBLICATIONS

Zhou, X. et al., "Full color waveguide liquid crystal display," Optics Letters, vol. 42, No. 18, Sep. 15, 2017, pp. 3706-3709 (4 pages).
Moynihan, T., "What Are Quantum Dots, and Why Do I Want Them in My TV?," Wired, <https://www.wired.com/2015/01/primer-quantum-dot/>, Jan. 19, 2015 (8 pages).
Rodrigues, S., "Dual-Sided Transparent Display Panel", U.S. Appl. No. 16/897,577, filed Jun. 10, 2020.

* cited by examiner

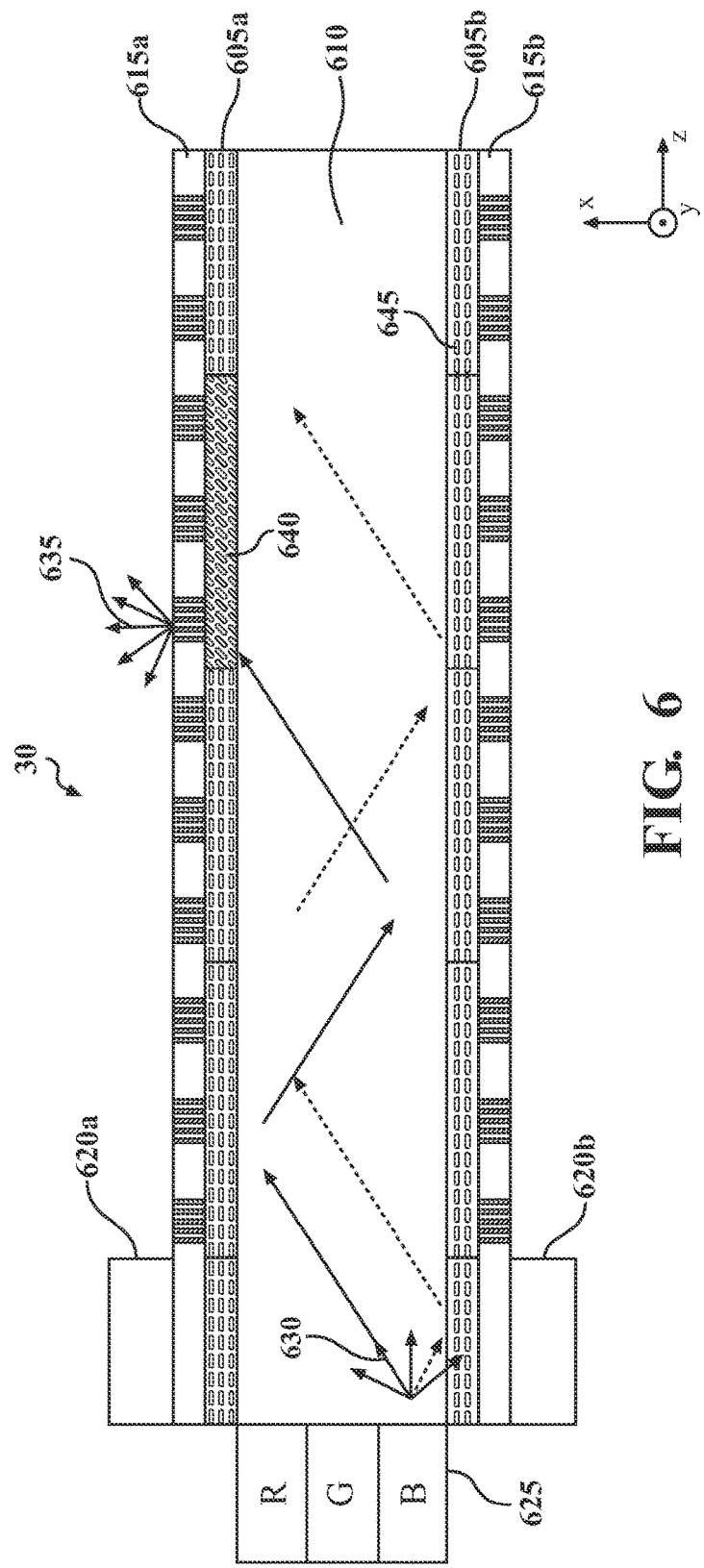

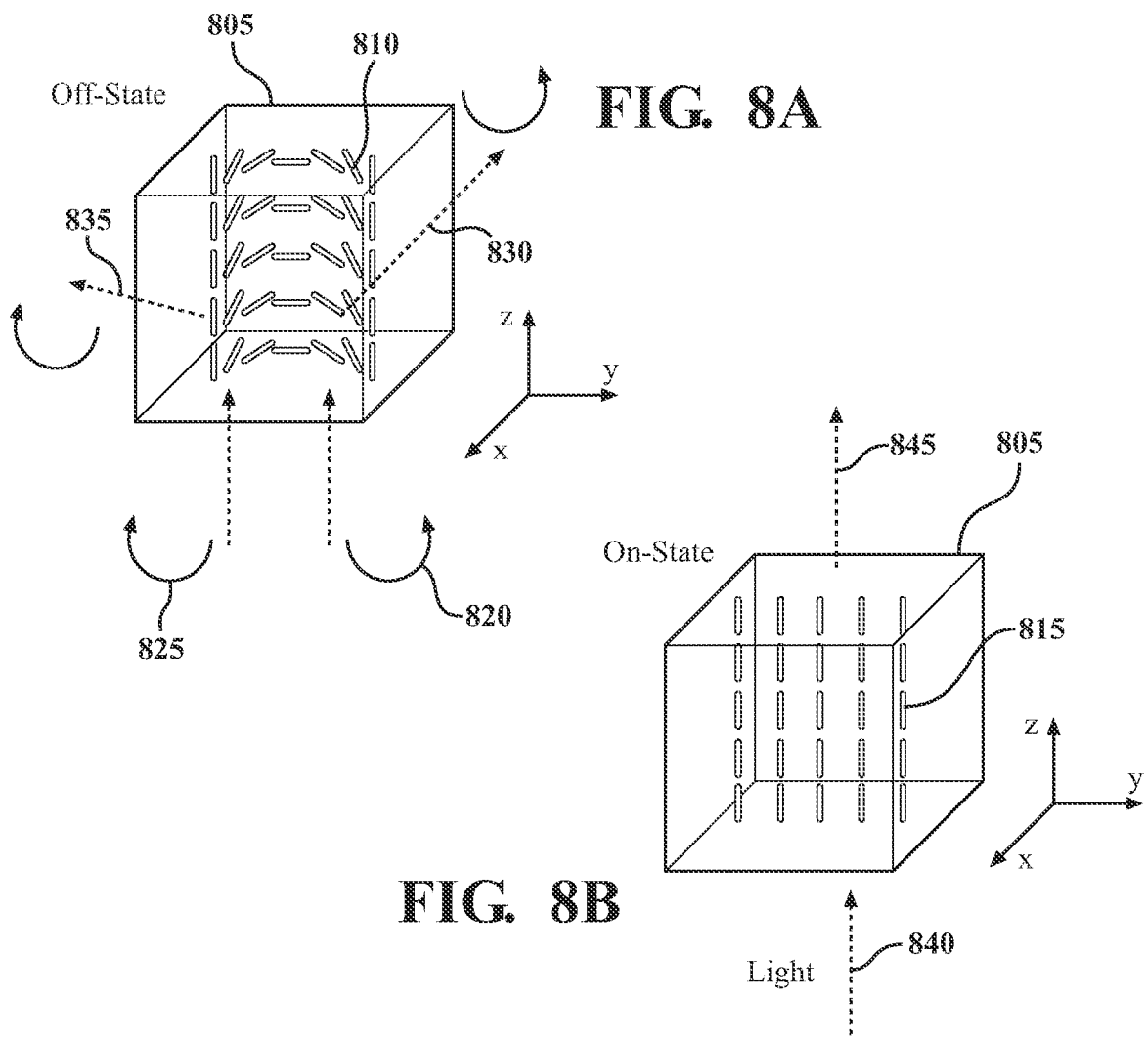
FIG. 8A
FIG. 8B
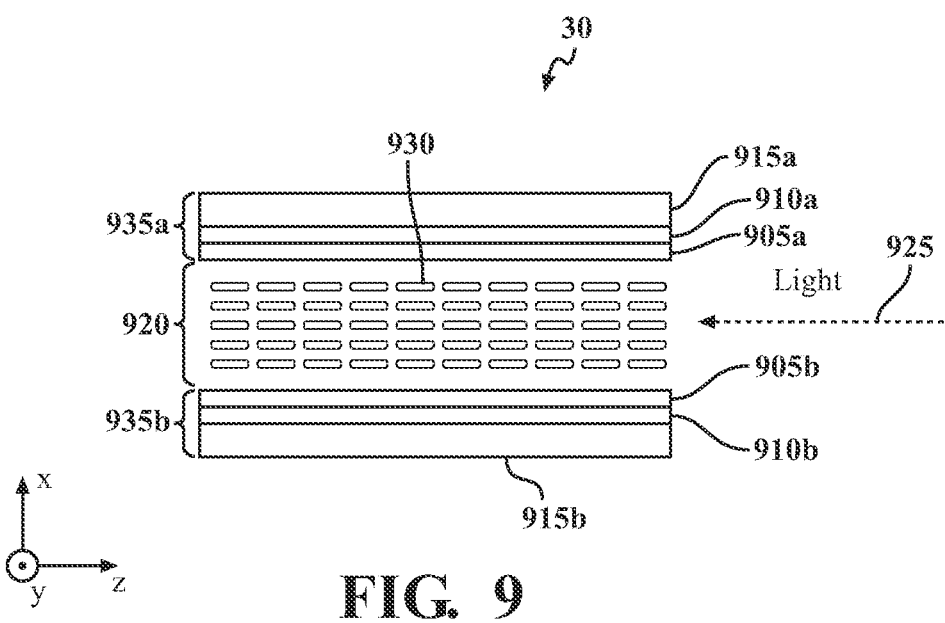
FIG. 9

DUAL-SIDED DISPLAY FOR A VEHICLE

FIELD

The subject matter described herein relates in general to vehicles and, more particularly, to vehicle displays.

BACKGROUND

Some vehicles can include back-up cameras. Back-up cameras may be configured to capture visual data of the exterior environment behind the vehicle. The vehicle can include a display in an instrument panel of the vehicle. The display can be configured to display the visual data of the exterior environment behind the vehicle.

SUMMARY

In one respect, the present disclosure is directed to a vehicle. The vehicle can include a window including an interior side and an exterior side. The vehicle can include a camera operatively positioned to capture visual data of a portion of an exterior environment of the vehicle. The vehicle can include a dual-sided transparent display that forms at least a portion of the window. The vehicle can include a processor operatively connected to the camera and the dual-sided transparent display. The processor can be configured to selectively cause the dual-sided transparent display to display exterior visual information on the exterior side. The processor can be configured to selectively cause the dual-sided transparent display to display interior visual information on the interior side. The interior visual information can include the visual data of the portion of the exterior environment of the vehicle.

In another respect, the present disclosure is directed to a method for a vehicle. The vehicle can include a window including an interior side and an exterior side. The vehicle can include a camera operatively positioned to capture visual data of a portion of an exterior environment of the vehicle. The vehicle can include a dual-sided transparent display that forms at least a portion of the window. The method can include causing exterior visual information to be displayed on the exterior side. The method can include causing interior visual information to be displayed on the interior side. The interior visual information can include the visual data of the portion of the exterior environment of the vehicle.

BRIEF DESCRIPTION OF THE DRAWINGS

FIG. 5 is an example of a method using the dual-sided display system.

FIG. 6 is an example of a first embodiment of a dual-sided transparent display that can be used in connection with the dual-sided display system.

FIGS. 8A and 8B are an example of various aspects of a third embodiment of a dual-sided transparent display that can be used in connection with the dual-sided display system.

FIG. 9 is an example of the third embodiment of a dual-sided transparent display that can be used in connection with the dual-sided display system.

DETAILED DESCRIPTION

Figure 1:
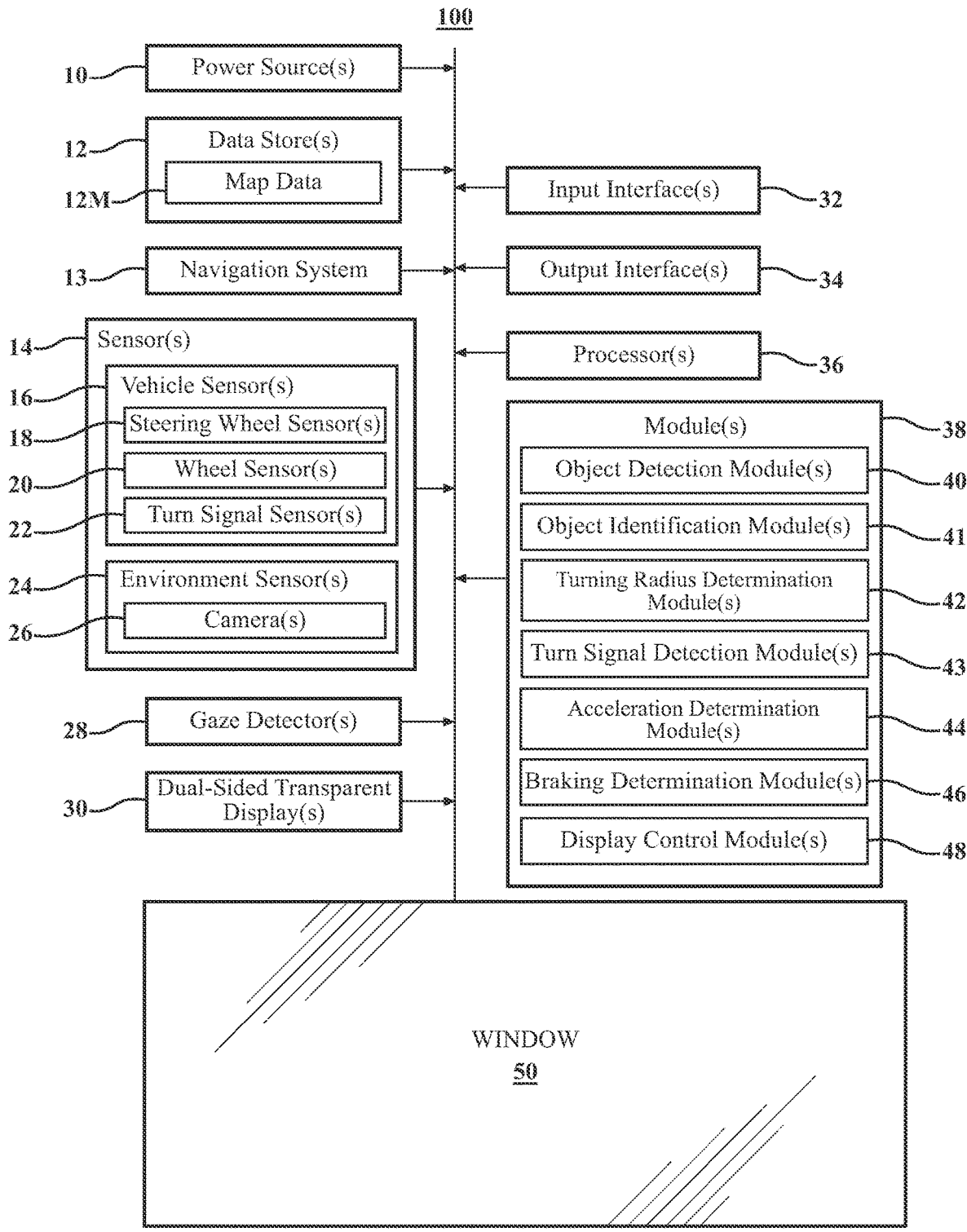
FIG. 1 is an example of a dual-sided display system for a vehicle.

In vehicles equipped with side view mirrors, the side view mirrors can create problems including wind drag and reduced fuel efficiency. Moreover, the side view mirrors do not enable a driver of the vehicle to have full visibility of the exterior environment of the vehicle. For example, despite having the side view mirrors, there may be one or more blind spots in the driver's field of view.

According to arrangements described herein, a dual-sided display system can be used in a vehicle to replace the side view mirrors, improve the aerodynamics of the vehicle, and/or increase the visibility of the driver of the exterior environment of the vehicle. Moreover, the dual-sided display system can be used to communicate warnings and/or signals to adjacent entities, such as other vehicles, pedestrians, and bikers, in the exterior environment of the vehicle.

The dual-sided display system can include a dual-sided transparent display forming at least a portion of a window of a vehicle. The dual-sided display system can include a camera operatively positioned to capture visual data of a portion of the exterior environment of the vehicle. The dual-sided transparent display can be configured to display exterior visual information on an exterior side of the window. The dual-sided transparent display can be configured to display interior visual information on an interior side of the window. The interior visual information can include the visual data of the portion of the exterior environment of the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a dual-sided display system 100 for a vehicle is shown. The dual-sided display system 100 can include various elements. Some of the possible elements of the dual-sided display system 100 are shown in FIG. 1 and will now be described. However, it will be understood that it is not necessary for the dual-sided display system 100 to have all of the elements shown in FIG. 1 or described herein. The dual-sided display system 100 can have any combination of the various elements shown in FIG. 1. Further, the dual-sided display system 100 can have additional elements to those shown in FIG. 1. In some arrangements, the dual-sided display system 100 may not include one or more of the elements shown in FIG. 1. Further, the elements shown may be physically separated by large distances. In some arrangements, one or more of the elements shown in FIG. 1 may be located onboard a vehicle or in a remote location.

The dual-sided display system 100 can include one or more power sources 10, one or more data stores 12 including map data 12M, a navigation system 13, one or more sensors 14, including one or more vehicle sensors 16 (one or more steering wheel sensors 18, one or more wheel sensors 20, and/or one or more turn signal sensors 22) and one or more environment sensors 24 (including one or more cameras 26), one or more gaze detectors 28, one or more dual-sided transparent displays 30, one or more input interfaces 32, one or more output interfaces 34, one or more processors 36, one or more modules 38 (including one or more object detection modules 40, one or more object identification modules 41, one or more turning radius determination modules 42, one or more turn signal detection modules 43, one or more acceleration determination modules 44, one or more braking determination modules 46, and/or one or more display control modules 48), and one or more windows 50.

The various elements of the dual-sided display system 100 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the dual-sided display system 100 can include and/or execute suitable communication software, which enable the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.10, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

Figure 2A:
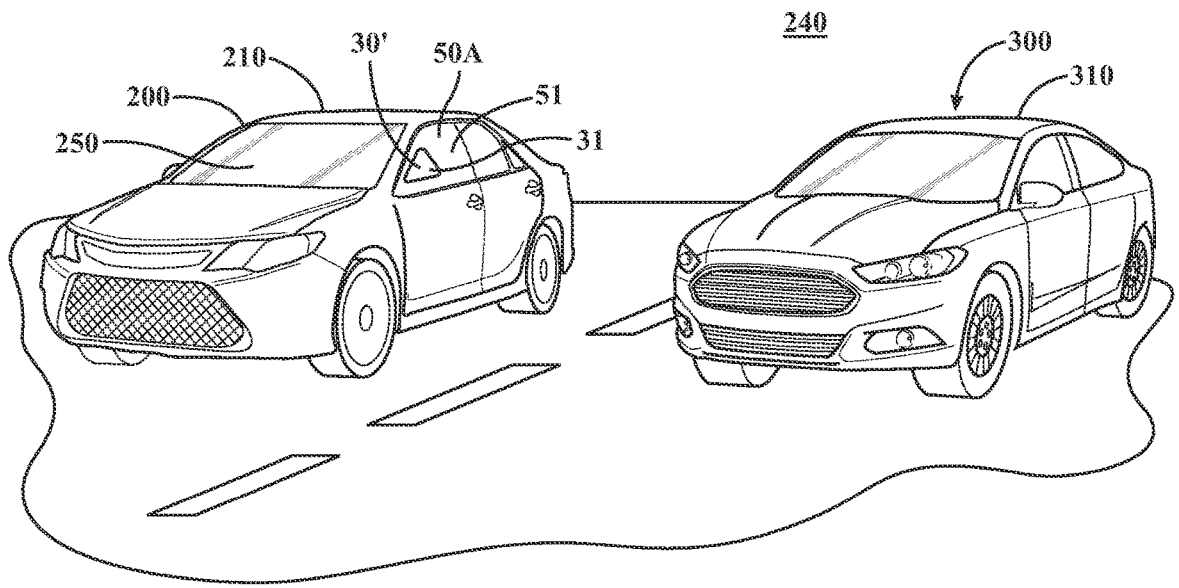
FIG. 2A is an example of a first driving scenario, showing exterior visual information displayed by the dual-sided display system on an exterior side of a window of the vehicle.
Figure 2B:
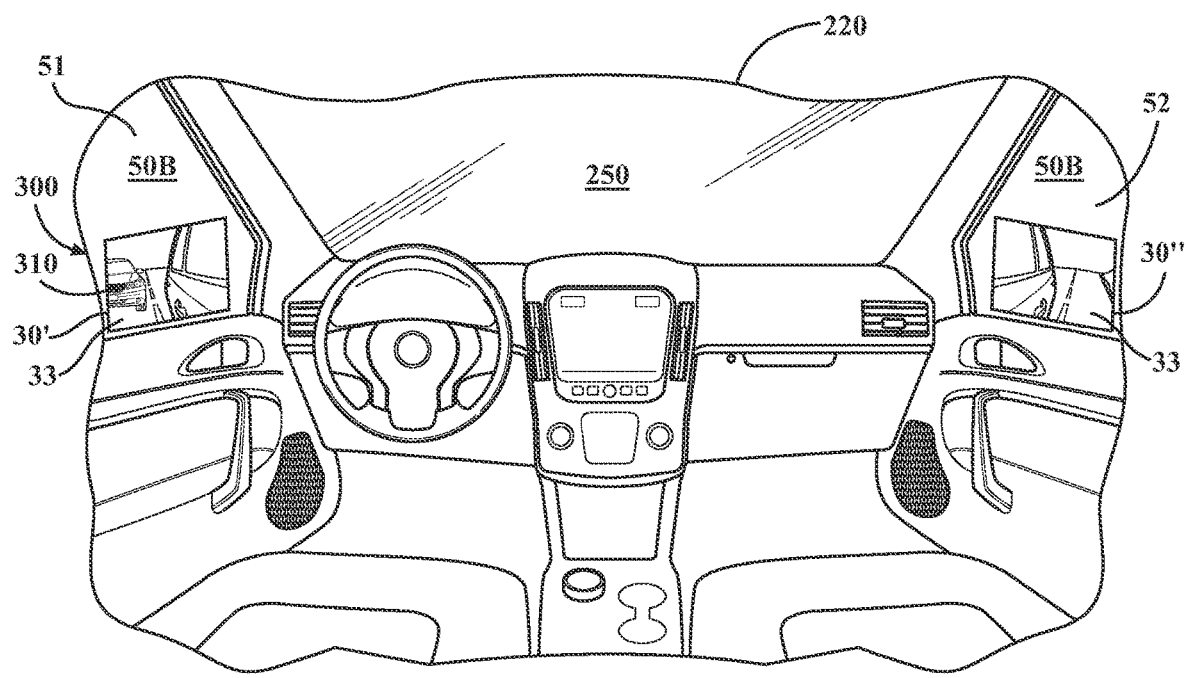
FIG. 2B is an example of the first driving scenario from within the passenger compartment of the vehicle, showing interior visual information displayed by the dual-sided display system on the interior side of the windows.

The dual-sided display system 100 can be implemented in a vehicle. Referring to FIGS. 2A and 2B, a vehicle 200 is shown. As used the term "vehicle" means any form of powered transport, now known or later developed. The vehicle 200 may be operated manually by a human driver, semi-autonomously by a mix of manual inputs from a human driver and autonomous inputs by one or more vehicle computers, fully autonomously by one or more vehicle computers (with or without a human occupant), or any combination thereof. Moreover, the vehicle 200 can be part of a fleet of autonomous vehicles. Each of the autonomous vehicles in the fleet can include its own dual-sided display system 100 for communicating with adjacent vehicles, pedestrians, and/or bikers. The vehicle 200 can include an exterior 210 (FIG. 2A) and a passenger compartment 220 (FIG. 2B). The window 50 of the dual-sided display system 100 can be a window of the vehicle 200. For example, window 50 can be a driver's side window 51, a passenger's side window 52, or a windshield 250 of the vehicle 200. In other examples, the window 50 can be a rear side window or a rear windshield of the vehicle 200. The window 50 can include an exterior side 50A and an interior side 50B. The dual-sided display system 100 can be implemented in the vehicle 200 to replace the side view mirrors of the vehicle 200. As shown in FIG. 2A, the vehicle 200 does not have side view mirrors. The dual-sided display system 100 can enable the driver to view the exterior environment 240 of the vehicle 200, including, for example, the portion of the exterior environment that would otherwise have been visible using the side view mirrors. The dual-sided display system 100 can be configured to communicate with passengers inside the vehicle as well as other vehicles, pedestrians, or bikers near the vehicle, for example, in the exterior environment 240 of the vehicle 200. The dual-sided display system 100 can enable autonomous vehicle communication to pedestrians or humans in the external environment, and/or the dual-sided display system 100 can enable unmanned vehicle to human communications.

The exterior environment 240 of the vehicle 200 can be the driving environment of the vehicle 200, and can include the road on which the vehicle 200 is driving, adjacent roads or sidewalks, adjacent entities (e.g., vehicles, pedestrians, and bikers, and/or obstacles) near the vehicle 200. In addition to replacing the side view mirrors of the vehicle 200, the dual-sided display system 100 can be configured to communicate warnings and/or signals to an adjacent entity near the vehicle 200 and/or in the exterior environment 240 of the vehicle 200. Moreover, the dual-sided display system 100 can be configured to communicate warnings and/or signals to the driver of the vehicle 200 or to passengers riding in the vehicle 200.

Referring back to FIG. 1, the dual-sided display system 100 can include one or more power sources 10, as noted above. The power source(s) 10 can be any power source capable of and/or configured to provide sufficient power to the dual-sided display system 100 and the elements thereof.

For example, the power source(s) 10 can include one or more batteries, one or more fuel cells, one or more generators, one or more alternators, one or more solar cells, and combinations thereof. In some arrangements, the power source(s) 10 can be one or more power sources of the vehicle 200.

The dual-sided display system 100 can include one or more data stores 12, as noted above. The data store(s) 12 can include volatile and/or non-volatile memory. Examples of suitable data stores include RAM (Random Access memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 12 can be a component of the processor(s) 36, or the data store(s) 12 can be operatively connected to the processor(s) 36 for use thereby. As used herein, the term "operatively connected" can include direct or indirect connections, including connections without direct physical contact. The data store(s) 12 can be configured to store map data 12M, and/or any other data and/or information from one or more elements of the dual-sided display system 100.

The map data 12M can include maps of one or more geographic areas. In some instances, the map data 12M can include information or data on roads, traffic control devices, road markings, street lights, structures, features, and/or landmarks in the one or more geographic areas. The map data 12M can include information about ramps, merging points between the ramps and the main lanes, and geo-fences surrounding the merging points. The map data 12M can be in any suitable form. In some instances, the map data 12M can include aerial views of an area. In some instances, the map data 12M can include ground views of an area, including 360 degree ground views. The map data 12M can include measurements, dimensions, distances, positions, coordinates, and/or information for one or more items included in the map data 12M and/or relative to other items included in the map data 12M. The map data 12M can include a digital map with information about road geometry. In one or more arrangements, the map data 12M can include information about the ground, terrain, roads, surfaces, and/or other features of one or more geographic areas. The map data 12M can include elevation data in the one or more geographic areas. The map data 12M can define one or more ground surfaces, which can include paved roads, unpaved roads, land, and other things that define a ground surface. The map data 12M can be high quality and/or highly detailed.

As noted above, the dual-sided display system 100 can include a navigation system 13. The navigation system 13 can include one or more mechanisms, devices, elements, components, systems, applications and/or combinations thereof, now known or later developed, configured to determine the geographic location of the vehicle 200 and/or to determine a travel route for the vehicle 200. The navigation system 13 can include one or more mapping applications to determine a travel route for the vehicle 200. The navigation system 13 can include a global positioning system, a local positioning system, or a geolocation system. In one or more arrangements, the navigation system 13 can include a global positioning system, a local positioning system or a geolocation system. The navigation system 13 can be implemented with any one of a number of satellite positioning systems, now known or later developed, including, for example, the United States Global Positioning System (GPS). Further, the navigation system 13 can use Transmission Control Protocol (TCP) and/or a Geographic information system (GIS) and location services. The navigation system 13 may include a transceiver configured to estimate a position of the vehicle 200 with respect to the Earth. For example, navigation system 13 can include a GPS transceiver to determine the vehicle's latitude, longitude and/or altitude. The navigation system 13 can use other systems (e.g. laser-based localization systems, inertial-aided GPS, and/or camera-based localization) to determine the location of the vehicle 200.

As noted above, the dual-sided display system 100 can include one or more sensors 14. The term "sensor," as used herein, can include any device, component, and/or system that can detect, determine, assess, monitor, measure, quantify, acquire, and/or sense something. The sensor(s) 14 can detect, determine, assess, monitor, measure, quantify, acquire, and/or sense in real-time. The term "real-time," as used herein, can mean a level of processing responsiveness that a user or system senses as sufficiently immediate for a particular process or determination to be made, or that enables the processor to keep up with some external process. The sensor(s) 14 can be operatively connected to the processor(s) 36, the data store(s) 12, and/or any other elements of the dual-sided display system 100. In arrangements in which the dual-sided display system 100 includes a plurality of sensors 14, the sensors 14 can work independently from each other. Alternatively, two or more of the sensors 14 can work in combination with each other. In this example, the two or more sensors 14 can form a sensor network.

The sensor(s) 14 can include any suitable type of sensor. The sensor(s) 14 can include one or more vehicle sensors 16, as noted above. The vehicle sensor(s) 16 can detect, determine, assess, monitor, measure, quantify, and/or sense information about the vehicle itself (e.g., position, orientation, speed, etc.). The vehicle sensor(s) 16 can include the steering wheel sensor(s) 18, the wheel sensor(s) 20, and/or the turn signal sensor(s) 22. The steering wheel sensor(s) 18 can be configured to collect data and/or information about a steering wheel of the vehicle 200. For example, the steering wheel sensor(s) 18 can be configured to collect data and/or information about the position of the steering wheel, a steering wheel angle, how much the steering wheel has turned in a specific amount of time, and/or how fast the steering wheel is being turned. In some arrangements, the steering wheel sensor(s) 18 can include one or more rotary position sensors. In some instances, the wheel sensor(s) 20 can be configured to collect data and/or information about the wheel(s) of the vehicle 200. For example, the wheel sensor(s) 20 can be configured to collect data and/or information about the speed the wheel(s) are spinning, whether the wheel(s) are being turned, and the angle at which the wheel(s) are being turned. The turn signal sensor(s) 22 can be configured to determine whether a turn signal of the vehicle 200 is activated or deactivated. In some arrangements, the vehicle sensor(s) 16 can be part of other systems typical of vehicles, for example, parking assist systems, lane keeping assist systems, adaptive cruise control systems, etc.

The sensor(s) 14 can also include one or more environment sensors 24. The environment sensor(s) 24 can be configured to detect, determine, assess, monitor, measure, quantify, acquire, and/or sense driving environment data. The term "driving environment data," as used herein, includes any data or information about the exterior environment 240 in which the vehicle 200 is located or one or more portions thereof. The environment sensor(s) 24 can include the camera(s) 26. The camera(s) 26 can be located on the vehicle 200 for example, positioned along one or both sides of the vehicle 200 on the exterior 210 of the vehicle 200. In such arrangements, the camera(s) 26 can be substantially flush with or recessed from the exterior 210 of the vehicle 200 such that the camera(s) 26 do not increase the exterior envelope of the vehicle 200. Additionally or alternatively, the camera(s) 26 can be located in any other suitable location on the vehicle 200. The camera(s) 26 can be any suitable camera(s), for example, one or more wide-angle camera(s), one or more fish-eye camera(s), an infrared camera, a thermal camera, and/or a camera modified with a lens of a different focal length.

The camera(s) 26 can be configured to acquire visual (e.g., video) data of a portion of the exterior environment 240 of the vehicle 200. For example, the camera(s) 26 can be rearward-facing camera(s) 26 configured to acquire visual data of a portion of the exterior environment 240 behind the vehicle 200. Additionally or alternatively, the camera(s) 26 can be side-facing camera(s) 26 configured to acquire visual data of a portion of the exterior environment 240 on one or more the sides of the vehicle 200. The rearward-facing camera(s) 26 and/or the side facing camera(s) 26 can be operatively positioned to capture visual data of a portion of the exterior environment 240 that would normally be visible by a driver of the vehicle 200 through the side view mirrors. Additionally or alternatively, the camera(s) 26 can also be forward-facing camera(s) 26 configured to acquire visual data of a portion of the exterior environment 240 ahead of the vehicle 200.

The camera(s) 26 can be located in any suitable location on the vehicle 200. For example, the vehicle 200 can include one or more cameras 26 located on the vehicle 200 on the driver's side, which can be configured to acquire visual data of the exterior environment 240 on the driver's side of the vehicle 200. Alternatively or additionally, the vehicle 200 can include one or more cameras 26 located on the vehicle 200 on the passenger's side, which can be configured to acquire visual data of the exterior environment 240 on the passenger's side of the vehicle 200. As shown in FIGS. 2A-4B, the driver's side of the vehicle 200 is the left side of the vehicle 200, and the passenger's side of the vehicle 200 is the right side of the vehicle 200. However, it will be understood that in some arrangements, the driver's side of the vehicle 200 can be the right side of the vehicle 200, and the passenger's side of the vehicle 200 can be the left side of the vehicle 200.

The visual data collected by the camera(s) 26 can include visual and/or still images of the exterior environment 240. In some arrangements, the visual data can be acquired continuously in real-time. In other arrangements, the visual data can be acquired periodically, irregularly, randomly, or in response to a user input or command. The camera(s) 26 can be operatively connected to the processor(s) 36. The camera(s) 26 can be any suitable camera and/or other imaging device. The camera(s) 26 can also be configured to zoom in or otherwise enlarge and/or enhance the visual data. The camera(s) 26 can be configured to acquire visual data in any suitable wavelength on the electromagnetic spectrum.

The dual-sided display system 100 can include one or more gaze detectors 28, as noted above. The gaze detector(s) 28 can be located in the passenger compartment 220 of the vehicle 200. The gaze detector(s) 28 can be operatively connected to the processor(s) 36. The gaze detector(s) 28 can be configured to detect one or more characteristics and/or movements of the driver. For example, the gaze detector(s) 28 can detect movements of the driver's head and/or movements of the driver's eyes. Using this information, the gaze detector(s) 28 and/or the processor(s) 36 can determine the line of sight of the driver, for example, the direction in which the driver is looking. Additionally or alternatively the gaze detector(s) 28 and/or the processor(s) 36 can determine if the driver moves his or her head to look toward a blind spot of the vehicle 200. Additionally or alternatively, the gaze detector(s) 28 and/or the processor(s) 36 can also be configured to detect when the driver is looking toward a pedestrian. The gaze detector(s) 28 can include any suitable technology, now known or later developed, configured to perform these processes. In some arrangements, the gaze detector(s) 28 can be part of driver monitoring systems typical of vehicles, for example, fatigue detection systems, security systems, etc.

As noted above, the dual-sided display system 100 can include one or more dual-sided transparent display(s) 30. The dual-sided transparent display(s) 30 can form at least a portion of one or more windows 50 of the vehicle 200. For example, the driver's side window 51 can include a driver's side dual-sided transparent display 30' and the passenger's side window 52 can include a passenger's side dual-sided transparent display 30". Moreover, the windshield 250 can include a windshield dual-sided transparent display 30'''. While the dual-sided transparent displays 30 are described herein in connection with the driver's side window 51, the passenger's side window 52, and the windshield 250, it will be understood that the dual-sided transparent displays 30 can be used in connection with any other window of the vehicle 200, including the rear side windows and/or the rear windshield.

As noted above, the window(s) 50 can include an exterior side 50A and an interior side 50B. In some instances, the interior side 50B can be substantially parallel to the exterior side 50A. The exterior side 50A and/or the interior side 50B can include a surface of the window 50, for example, a surface of a glass pane. Alternatively, the exterior side 50A and/or the interior side 50B can be separate window components, for example, separate glass panes. The window(s) 50 can be made of any suitable material, now known or later developed. The window(s) 50 can have any suitable size, shape, and/or configuration. The window(s) 50 can include one or more layers.

Figure 3A:
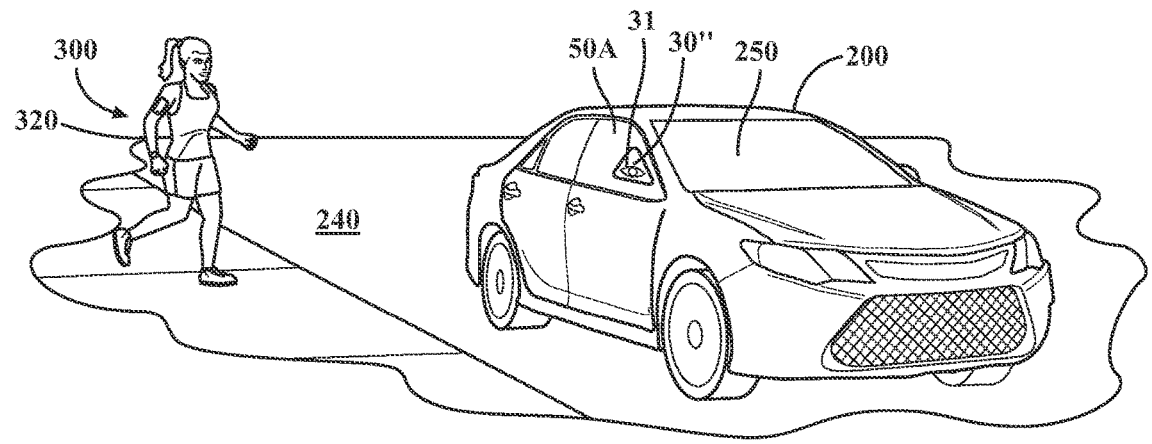
FIG. 3A is an example of a second driving scenario, showing exterior visual information displayed by the dual-sided display system on an exterior side of a window of a vehicle.
Figure 4A:
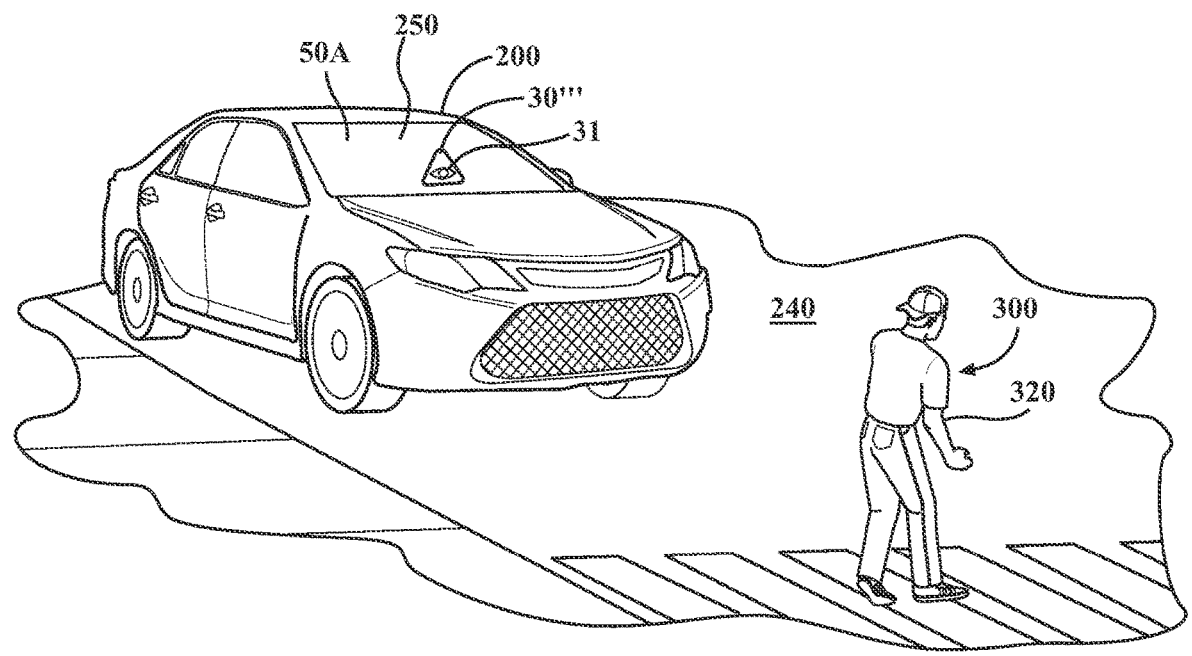
FIG. 4A is an example of a third driving scenario, showing exterior visual information displayed by the dual-sided display system on an exterior side of a window of a vehicle.

The dual-sided transparent display(s) 30 can be configured to display exterior visual information 31 on the exterior side 50A of the window(s) 50. The exterior visual information 31 can be displayed to an adjacent entity 300 in the exterior environment 240 of the vehicle 200, as shown in FIGS. 2A, 3A, and 4A. The exterior visual information 31 can include, for example, a turning warning, a lane change warning, an accelerating warning, and/or a braking warning, as will be described in further detail below. The exterior visual information 31 can also include, for example, a signal to an adjacent entity 300 such as a pedestrian, indicating that the driver is looking at the pedestrian, as will be described in further detail below. The dual-sided transparent display(s) 30 can also be configured to display interior visual information 33 on the interior side 50B of the window(s) 50. The interior visual information 33 can be displayed to an occupant of the vehicle 200, for example, the driver of the vehicle 200. The interior visual information 33 can include the data captured by the camera(s) 26 and/or warnings and/or signals to the driver or another occupant of the vehicle 200.

In some arrangements, the dual-sided transparent display(s) 30 can be configured such that the exterior visual information 31 and the interior visual information 33 do not interfere with (e.g., occlude) each other. Accordingly, the exterior visual information 31 is not visible on the interior side 50B of the window(s) 50. Similarly, the interior visual information 33 is not visible on the exterior side 50A of the window(s) 50. In some arrangements, the dual-sided transparent display(s) 30 can be configured to display the interior visual information 33 and the exterior visual information 31 simultaneously. In other arrangements, the dual-sided transparent display(s) 30 can be configured to display the interior visual information 33 and the exterior visual information 31 at different times. Various embodiments of the dual-sided transparent display(s) 30 will be described in further detail below in connection with FIGS. 6-9.

As noted above, the dual-sided display system 100 can include one or more input interfaces 32. The term "input interface," as used herein, includes any device, component, system, element, or arrangement or groups thereof that enable information and/or data to be entered into a machine. The input interface(s) 32 can be located in the passenger compartment 220. In some arrangements, the input interface(s) 32 can include the dual-sided transparent display(s) 30. The input interface(s) 32 can be any suitable input interface, including a keypad, display, touch screen, multi-touch screen, button, joystick, mouse, trackball, microphone, and/or any combination thereof. In some arrangements, the input interface(s) 32 can be or can be communicatively coupled to an external device, which can be a device that is not a part of the vehicle and/or that be readily moved into and out of the vehicle by a person. For example, the input interface(s) 32 can be or can be communicatively coupled to a portable communication device (e.g., smart phone, tablet, etc.) or an application installed on a portable communication device. The external device can be configured to send data to the dual-sided display system 100 in response to user inputs provided on the external device. The input interface(s) 32 can be configured to receive an input. For example, the input interface(s) 32 can receive an input from the driver to activate and/or deactivate one or more elements of the dual-sided display system 100, including the dual-sided transparent display(s) 30. In some arrangements, the input interface(s) 32 can include one or more graphical user interface elements. In one or more arrangements, the one or more graphical user interface elements can be presented, for example, on the dual-sided transparent display(s) 30 or on some other display within the passenger compartment 220.

The dual-sided display system 100 can include one or more output interfaces 34, as noted above. The term "output interface," as used herein, includes any device, component, system, element, or arrangement or groups thereof that enable information and/or data to be presented. The output interface(s) 34 can be located in the passenger compartment 220. In some arrangements, the output interface(s) 34 can include the dual-sided transparent display(s) 30. In other arrangements, the output interface(s) 34 can be any suitable output interface, including a display, touch screen, multi-touch screen, an earphone, a speaker, and/or any combination thereof. In some arrangements, the output interface(s) 34 can be or can be communicatively coupled to an external device, which can be a device that is not a part of the vehicle and/or that be readily moved into and out of the vehicle by a person. For example, the output interface(s) 34 can be or can be communicatively coupled to a portable communication device (e.g., smart phone, tablet, etc.) and/or an application installed on the portable communication device. The dual-sided display system 100 can be configured to send messages, alerts, or notifications to the portable communication device for display to a user. The output interface(s) 34 can be configured to receive data from one or more elements of the dual-sided display system 100, including the data store(s) 12, the sensor(s) 14, the gaze detector(s) 28, the processor(s) 36, and/or the module(s) 38. Specifically, the output interface(s) 34 can be configured to receive and display the visual data from the camera(s) 26.

The dual-sided display system 100 can include one or more processors 36, as noted above. As used herein, the term "processor" can mean any component or group of components that are configured to execute any of the processes described herein or any form of instructions to carry out such processes or cause such processes to be performed. The processor(s) 36 can be implemented with one or more general-purpose processor(s) and/or one or more special-purpose processor(s). Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 36 can include at least one hardware circuit (e.g., an integrated circuit) configured to carry out instructions contained in program code. In arrangements in which there is a plurality of processors, the processors can work independently from each other or one or more processors can work in combination with each other.

The processor(s) 36 can be configured to receive and/or access data from any of the elements in FIG. 1, including the data store(s) 12, the sensor(s) 14, and/or the gaze detector(s) 28. The processor(s) 36 can be configured to selectively cause the dual-sided transparent display(s) 30 to display the exterior visual information 31 on the exterior side 50A of the window(s) 50. The processor(s) 36 can also be configured to selectively cause the dual-sided transparent display(s) 30 to display the interior visual information 33 on the interior side 50B of the window(s) 50.

As noted above, the dual-sided display system 100 can include one or more modules 38. The module(s) 38 can be implemented as computer readable program code that, when executed by the processor(s) 36, implement one or more of the various processes described herein. The module(s) 38 can be a component of the processor(s) 36, or the module(s) 38 can be executed on and/or distributed among other processing systems to which the processor(s) 36 are operatively connected. The module(s) 38 can include instructions (e.g., program logic) executable by the processor(s) 36. Alternatively or additionally, the data store(s) 12 may contain such instructions. In one or more arrangements, the module(s) 38 described herein can include artificial or computational intelligence elements, e.g. neural network, fuzzy logic, or other machine learning algorithms. As noted above, the module(s) 38 can include one or more object detection modules 40, one or more object identification modules 41, one or more turning radius determination modules 42, one or more turn signal detection modules 43, one or more acceleration determination module(s) 44, one or more braking determination module(s) 46, and/or one or more display control modules 48. Each of these modules will be described in further detail in turn below.

The object detection module(s) 40 can be configured to detect the presence of an object in the exterior environment 240 of the vehicle 200. In some arrangements, the object can be the adjacent entity 300. As shown in FIGS. 2A and 2B, the adjacent entity 300 is an adjacent vehicle 310. However, the adjacent entity 300 can be an adjacent pedestrian 320 (as shown in FIG. 3A-4B) or a biker (e.g., motorcyclist, bicyclist, etc.) In some instances, the object itself may not be directly detectable. The object detection module(s) 40 can detect the presence of an object in any suitable manner, such as by lidar, radar, vehicle communication, sonar, camera data, GPS data, position data, location data, and/or by using the map data 12M. In addition to detecting the presence of an object, the object detection module(s) 40 can be configured to determine a distance between the object and the vehicle 200. These characteristics can be determined in any suitable manner, such as by ranging sensors, radar, lidar, sonar, cameras (which can include visual or infrared cameras), by using the map data 12M, or any combinations of such techniques. In some arrangements, the object detection module(s) 40 can detect the presence of an object and the distance between the object and the vehicle using data from the sensor(s) 14 of the vehicle 200. Any suitable object detection technique, now known or later developed, can be used.

If the object detection module(s) 40 detects the presence of an object, the object identification module(s) 41 can be configured to determine the identity or nature of the object. In some arrangements, the object identification module(s) 41 can determine whether an object is an adjacent vehicle, pedestrian, or biker. The object identification module(s) 41 can determine the identity of an object in any suitable manner. In one or more arrangements, the detected object can be compared to identifying features of an object, such as color, shape, size, dimensions, movement, sounds, etc.

In one or more arrangements, the object identification module(s) 41 can compare acquired object data to object data for matches. For instance, in one or more arrangements, the object identification module(s) 41 can include and/or have access to an object image database. The objects image database can include one or more images of a plurality of different objects (e.g., vehicles, pedestrians, bikers, etc.). The images can be any object-relevant data obtained by a lidar sensor, a radar sensor, and/or a camera sensor. The images may be of one or more portions of the exterior of at least a portion of a plurality of different objects. For instance, the images can be of at least a portion of an object. The images can be provided in any suitable format. The object image database can be located on-board the vehicle 200, such as in the data store(s) 12, or it can be located in a source external to the vehicle 200 (e.g. in a cloud-based data store).

The object identification module(s) 41 can also include any suitable object recognition software. The object recognition software can analyze image(s) and/or video captured by the sensor(s) 14. The object recognition software can query the object image database for possible matches. For instance, images or video captured by the sensor(s) 14 can be compared to images in the object image database for possible matches. Additionally or alternatively, measurements or other aspects of an image captured by the sensor(s) 14 can be compared to measurements or other aspects of any images in the object image database. The object identification module(s) 41 can identify the detected object as a particular type of object if there is a match between the captured image and an image in the object database. "Match" or "matches" means that an image or other information collected by the sensor(s) 14 and one or more of the images in the object image database are substantially identical. For instance, an image or other information collected by the sensor(s) 14 and one or more of the images in the object image database can match within a predetermined probability (e.g., at least about 85%, at least about 90%, at least about 95% or greater) or confidence level.

As noted above, the dual-sided display system 100 can include one or more turning radius determination modules. The turning radius determination module(s) 42 can be configured to determine the turning radius of the vehicle 200. The turning radius determination module(s) 42 can be configured to determine the turning radius of the vehicle 200 in any suitable manner. For example, the turning radius determination module(s) 42 can use data from the vehicle sensor(s) 16, including the steering wheel sensor(s) 18 and/or the wheel sensor(s) 20, data acquired or received by the navigation system 13 (e.g. GPS data), and/or map data 12M in order to calculate the turning radius of the vehicle 200. Moreover, the turning radius determination module(s) 42 can, in conjunction with the object detection module(s) 40 and the object identification module(s) 41, be configured to determine if a vehicle, a pedestrian, or a biker is located substantially within the turning radius of the vehicle 200.

As noted above, the dual-sided display system 100 can include one or more turn signal detection module(s) 43. The turn signal detection module(s) 43 can be configured to detect when a turn signal of the vehicle 200 is activated and/or deactivated. The turn signal detection module(s) 43 can detect when a turn signal of the vehicle 200 is activated and/or deactivated in any suitable manner. For example, the turn signal detection module(s) 43 can use data and/or information acquired by the turn signal sensor(s) 22.

In conjunction with the object detection module(s) 40, the turn signal detection module(s) 43 can be configured to determine if there is an adjacent entity 300 on the side of the vehicle 200 to which the turn signal indicates the vehicle 200 is turning. For example, if the turn signal detection module(s) 43 determines that the drivers' side turn signal of the vehicle 200 is activated, the object detection module(s) 40 can then determine if an adjacent entity 300 is located on the driver's side of the vehicle 200.

As noted above, the dual-sided display system 100 can include one or more acceleration determination module(s) 44. The acceleration determination module(s) 44 can be configured to detect when the vehicle 200 is accelerating. The acceleration determination module(s) 44 can detect if the vehicle 200 is accelerating in any suitable manner. For example, the acceleration determination module(s) 44 can detect when an accelerator pedal of the vehicle 200 is engaged or depressed or when a force or pressure is exerted on the accelerator pedal, and/or the acceleration determination module(s) 44 can use data and/or information from a speedometer of the vehicle 200 to determine when the vehicle 200 is accelerating. Accordingly, the sensor(s) 14 of the vehicle 200 can also include one or more accelerator pedal position sensors, one or more accelerator pedal pressure sensors, and/or one or more speedometers.

As noted above, the dual-sided display system 100 can include one or more braking determination module(s) 46. The braking determination module(s) 46 can be configured to detect when the vehicle 200 is braking. The braking determination module(s) 46 can detect if the vehicle 200 is braking in any suitable manner. For example, the braking determination module(s) 46 can detect when a brake pedal of the vehicle 200 is engaged or depressed or when a force or pressure is exerted on the brake pedal and/or on or by the brake pad, and/or the acceleration determination module(s) 44 can use data and/or information from a speedometer of the vehicle 200 to determine when the vehicle 200 is braking. In some arrangements, the braking determination module(s) 46 can detect when a signal that causes a brake pad to apply pressure is detected. Accordingly, in addition to the speedometers, the sensor(s) 14 of the vehicle 200 can also include one or more brake pedal position sensors, one or more brake pedal pressure sensors.

The dual-sided display system 100 can include one or more display control module(s) 48, as noted above. The display control module(s) 48 can be configured to activate and/or deactivate the dual-sided transparent display(s) 30. Such activation and deactivation can be based on data acquired by the sensor(s) 14, and/or gaze detector(s) 28, and/or based on information acquired by and/or detected by the processor(s) 36.

For example, the processor(s) 36 can be configured to determine when the vehicle 200 is about to make a turn or make a lane change and if an adjacent entity 300 is located in the turning radius of the vehicle 200 or an adjacent lane using the object detection module(s) 40, the object identification module(s) 41, the turning radius determination module(s) 42, the turn signal detection module(s) 43, the map data 12M, and/or the navigation system 13 (e.g. GPS data). If the processor(s) 36 determines that a turn signal of the vehicle 200 is activated and that an adjacent entity 300 is located substantially within the turning radius of the vehicle 200 or in an adjacent lane, the display control module(s) 48 can be configured to activate the dual-sided transparent display(s) 30 to display a turning warning on the exterior side 50A of the window(s) 50 of the vehicle 200. The dual-sided transparent display(s) 30 can also display, on the interior side 50B of the window(s) 50 of the vehicle 200, the visual data from the camera(s) 26 and/or a warning to the driver that there is an adjacent entity 300 in the turning radius of the vehicle 200 or in an adjacent lane.

In another example, the processor(s) 36 can be configured to determine when the vehicle 200 is accelerating and if there is an adjacent entity 300 located near the vehicle 200 using the object detection module(s) 40, the object identification module(s) 41, and/or the acceleration determination module(s) 44. For example, if the vehicle 200 is accelerating and there is an adjacent entity 300 located near the vehicle 200, the display control module(s) 48 can be configured to activate the dual-sided transparent display(s) 30 to display an accelerating warning on the exterior side 50A of the window(s) 50 of the vehicle 200. This warning may be useful to the adjacent entity 300 in order to determine the intent and/or the future actions of the driver of the vehicle 200. Further, this warning may be helpful to mitigate risk of collisions in situations such as merging on highways and lane changes. The dual-sided transparent display(s) 30 can also display, on the interior side 50B of the window(s) 50 of the vehicle 200, the visual data from the camera(s) 26.

Similarly, the processor(s) 36 can be configured to determine when the vehicle 200 is braking and if there is an adjacent entity 300 located near the vehicle 200 using the object detection module(s) 40, the object identification module(s) 41, and/or the braking determination module(s) 46. If the vehicle 200 is braking and there is an adjacent entity 300 located near the vehicle 200, the display control module(s) 48 can be configured to activate the dual-sided transparent display(s) 30 to display a braking warning on the exterior side 50A of the window(s) 50 of the vehicle 200. For example, if there is an adjacent entity 300 behind the vehicle 200, and the taillights of the vehicle 200 are broken, the dual-sided transparent display(s) 30 can be configured to display a braking warning on the rear windshield. In another example, if the adjacent entity 300 is attempting to merge into the lane of the vehicle 200, the vehicle 200 may brake to allow the adjacent entity 300 to merge. The adjacent entity 300 may not know that the vehicle 200 is braking, so it would be useful to display a braking warning on the exterior of a side window 50 of the vehicle 200. The dual-sided transparent display(s) 30 can also display, on the interior side 50B of the window(s) 50 of the vehicle 200, the visual data from the camera(s) 26.

In another example, the processor(s) 36 can be configured to determine if there is an adjacent vehicle 310 located ahead of the vehicle 200 or behind the vehicle 200, and if the adjacent vehicle 310 has its high beams on. If the processor(s) 36 determines that an adjacent vehicle 310 located ahead of or behind the vehicle 200 has its high beams on, the display control module(s) 48 can be configured to activate the dual-sided transparent display(s) 30 to display the exterior visual information 31 on the exterior side 50A of the window(s) 50. The exterior visual information 31 can be a warning to the adjacent vehicle 310 that its high beams are on.

In another example, the processor(s) 36 and/or the gaze detector(s) 28 can be configured to determine when the driver of the vehicle 200 is looking toward a pedestrian, as described above. If the processor(s) 36 and/or the gaze detector(s) 28 determine that the driver of the vehicle 200 is looking toward a pedestrian, the display control module(s) 48 can cause the dual-sided transparent display to display the interior visual information 33 on the interior side 50B of the window(s) 50. In this situation, the exterior visual information 31 can be a signal to the pedestrian that the driver of the vehicle 200 is looking at the pedestrian or has seen the pedestrian. This may be helpful to the pedestrian in situations in which the pedestrian cannot see the driver (such as if the window(s) 50 of the vehicle 200 are tinted). If the pedestrian knows that the driver of the vehicle 200 is looking at them or has seen them, the pedestrian may feel more comfortable and/or safer about taking certain actions, such as crossing a road.

In examples in which the vehicle 200 is an autonomous vehicle, the autonomous vehicle may recognize a pedestrian through image detection or other known methods. When the autonomous vehicle recognizes a pedestrian, the display control module(s) 48 can cause the dual-sided transparent display to display the exterior visual information 31 on the exterior side 50A of the window(s) 50. The exterior visual information 31 can be a signal to the pedestrian that the autonomous vehicle has recognized the pedestrian. This may be helpful to the pedestrian, as the pedestrian would not see a driver in the vehicle, and might not know whether it is safe to cross a road or otherwise move near the autonomous vehicle.

The processor(s) 36 and/or the gaze detector(s) 28 can be configured to detect the line of sight of the driver, as described above. The display control module(s) 48 can be configured to cause the location of the interior visual information 33 to move based on the line of sight of the driver. For example, the display control module(s) 48 can be configured to keep the interior visual information 33 generally in line with the driver's line of sight.

In some arrangements, the display control module(s) 48 can activate or deactivate the dual-sided transparent display(s) 30 responsive to a user input or command. In some arrangements, the display control module(s) 48 can activate the dual-sided transparent display(s) 30 whenever the vehicle 200 is in use or is in motion. In some arrangements, the display control module(s) 48 can deactivate the dual-sided transparent display(s) 30 whenever the vehicle 200 is not in use or is not in motion.

The dual-sided display system 100 can be configured to display the interior visual information 33 and/or the exterior information 31 on any suitable window 50, including the driver's side window 50, the passenger's side window 50, any of the rear window, and/or the windshield 250. In some arrangements, the dual-sided display system 100 can be configured to display the interior visual information 33 and/or the exterior visual information 31 responsive to determinations by the processor(s) 36 and/or the module(s) 38. The interior visual information 33 can include warnings and/or signals to an occupant of the vehicle 200. Similarly, the exterior visual information 31 can include warnings and/or signals to an adjacent entity 300 in the exterior environment 240 of the vehicle 200. The interior visual information 33 and/or the exterior visual information 31 can include words, pictures, and/or symbols. The interior visual information 33 and/or the exterior visual information 31 can be displayed periodically, irregularly, or even randomly. In some arrangements, the dual-sided transparent display(s) 30 can be configured to be continuously active (e.g., continuously displaying the interior visual information 33 and/or the exterior visual information 31) while the vehicle is in operation.

Referring now to FIGS. 2A-4A, various driving scenarios are shown. FIGS. 2A and 2B show a first driving scenario. As shown in FIG. 2A, an adjacent vehicle 310 is driving near the vehicle 200, for example, behind the vehicle 200 in an adjacent lane, or in the blind spot of the vehicle 200. The dual-sided display system 100 can be configured to display the exterior visual information 31, using the dual-sided transparent display(s) 30, to an adjacent vehicle 310 located in the exterior environment 240 of the vehicle 200. The exterior visual information 31 can be displayed on the exterior side 50A of the window 50. Non-limiting examples of the exterior visual information 31 can include a warning that the vehicle 200 is turning, making a lane change, accelerating, and/or braking.

As shown in FIG. 2B, the dual-sided display system 100 can be configured to display the interior visual information 33, using the dual-sided transparent display(s) 30, to an occupant of the vehicle 200, for example, the driver of the vehicle 200. The interior visual information 33 can be displayed on the interior side 50B of the side windows 50, for example, the driver's side window 50 and/or the passenger's side window 50. As shown in FIG. 2B, the interior visual information 33 can be visual data from the camera(s) 26 of the exterior environment 240 of the vehicle 200, including visual data of the adjacent vehicle 310. This has the effect of recreating the view that the driver would see if the vehicle 200 were equipped with traditional side view mirrors.

Figure 3B:
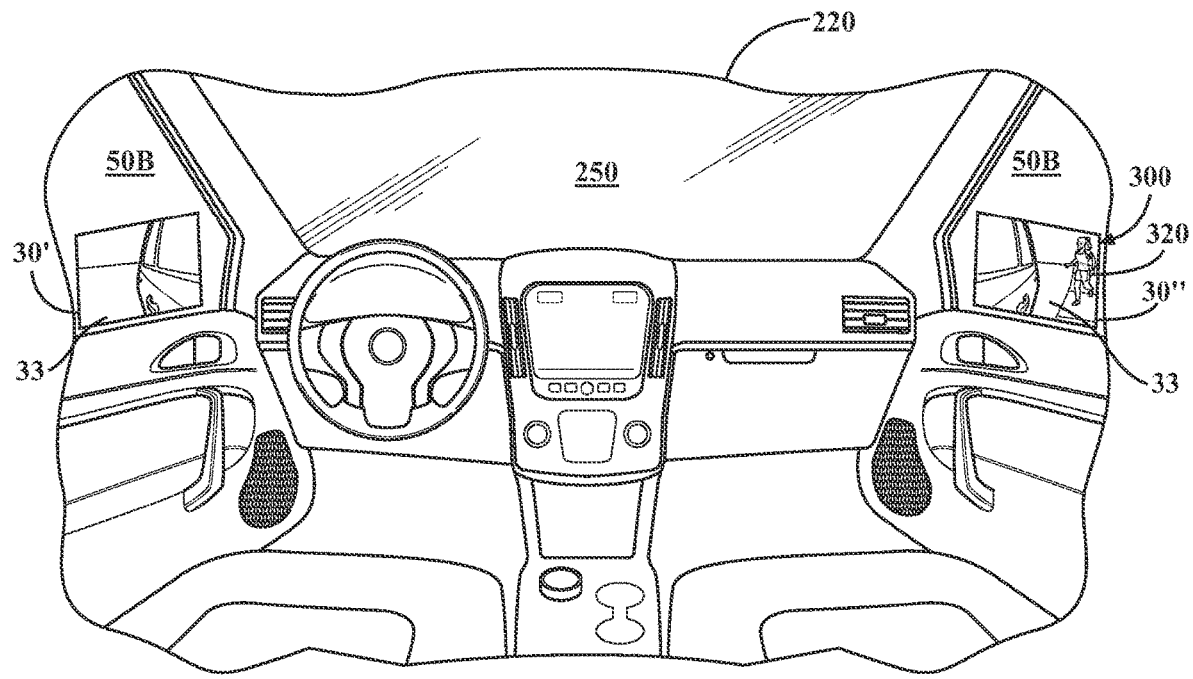
FIG. 3B is an example of the second driving scenario from within the passenger compartment of the vehicle, showing interior visual information displayed by the dual-sided display system on the interior side of the windows.

FIGS. 3A and 3B show a second driving scenario. As shown in FIG. 3A, the adjacent entity 300 is a pedestrian 320 located on a sidewalk next to the vehicle 200, for example, walking or running behind the vehicle 200 on an adjacent sidewalk, or located in a blind spot of the vehicle 200. The dual-sided display system 100 can be configured to display the exterior visual information 31, using the dual-sided transparent display(s) 30, to the adjacent pedestrian 320. The exterior visual information 31 can be displayed on the exterior side 50A of the window 50. Non-limiting examples of the exterior visual information 31 can include a warning that the vehicle 200 is turning, making a lane change, accelerating, and/or braking. In other arrangements, the exterior visual information 31 can be a signal to the pedestrian 320 that the driver has looked at the pedestrian 320 or is looking at the pedestrian 320. This signal can be displayed if the dual-sided display system 100 has detected a pedestrian 320 in the exterior environment 240 of the vehicle 200 and that the driver has turned his or her head in the direction of that pedestrian 320. This signal can be any suitable signal. For example, the signal can be a symbol of an eye and/or one or more words. In some arrangements, the exterior visual information 31 can be accompanied by audial warnings.

As shown in FIG. 3B, the dual-sided display system 100 can be configured to display the interior visual information 33, using the dual-sided transparent display(s) 30, to an occupant of the vehicle 200, for example, the driver of the vehicle 200. The interior visual information 33 can be displayed on the interior side 50B of the side windows 50, for example, the driver's side window 50 and/or the passenger's side window 50. As shown in FIG. 3B, the interior visual information 33 can be visual data from the camera(s) 26 of the exterior environment 240 of the vehicle 200, including visual data of the adjacent pedestrian.

Figure 4B:
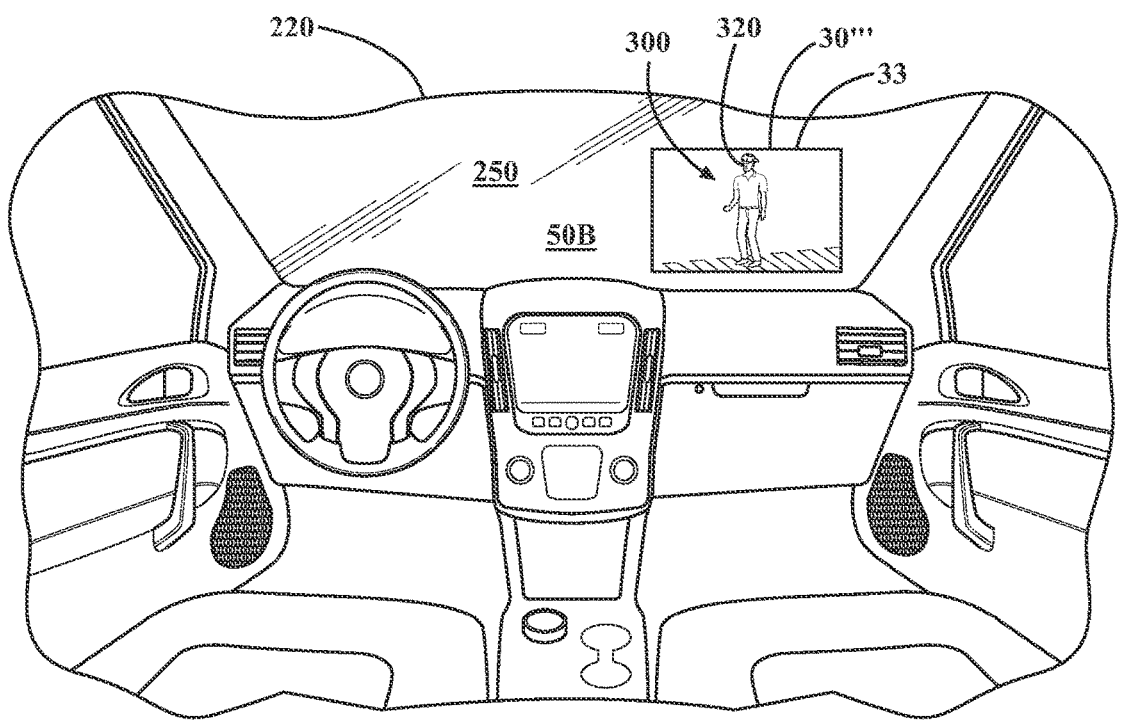
FIG. 4B is an example of the third driving scenario from within the passenger compartment of the vehicle, showing interior visual information displayed by the dual-sided display system on the interior side of the window.

FIGS. 4A and 4B show a third driving scenario. As shown in FIG. 4A, a pedestrian 320 is crossing a crosswalk ahead of the vehicle 200. As shown in FIG. 4A, the dual-sided display system 100 can be configured to display the exterior visual information 31, using the dual-sided transparent display(s) 30, to the pedestrian 320. The exterior visual information 31 can be displayed on the exterior side 50A of the windshield 250. As described above, the dual-sided transparent display system 100 can detect the pedestrian 320 ahead of the vehicle 200 and can determine whether the driver is looking in the direction of that pedestrian 320. The gaze detector(s) 28, the processor(s) 36, the object detection module(s) 40, and/or the object identification module(s) 41 can determine whether the driver is looking in the direction of the pedestrian 320 or has otherwise seen the pedestrian 320. If it is determined that the driver is looking in the direction of the pedestrian 320 or has otherwise seen the pedestrian 320, the dual-sided transparent display(s) 30 can be configured to display the exterior visual information 31 to the pedestrian 320. The exterior visual information 31 can be a signal to the pedestrian 320 that the driver has looked at the pedestrian 320 or is looking at the pedestrian 320. This signal can be any suitable signal. For example, the signal can be a symbol of an eye and/or one or more words. In some arrangements, the signal can be accompanied by audial warnings. Additionally or alternatively, the signal can include a signal that the vehicle 200 is braking, to indicate to the pedestrian that the vehicle 200 is slowing down at the crosswalk.

As shown in FIG. 4B, the dual-sided display system 100 can be configured to display the interior visual information 33, using the dual-sided transparent display(s) 30, to an occupant of the vehicle 200, for example, the driver of the vehicle 200. The interior visual information 33 can be displayed on the interior side 50B of the side windows 50, for example, the interior side 50B of the windshield 250. As shown in FIG. 4B, the interior visual information 33 can be visual data from the camera(s) 26 of the exterior environment 240 of the vehicle 200, including visual data of the pedestrian 320 on the crosswalk. In the scenario shown in FIG. 4B, the interior visual information 33 can be a zoomed-in or otherwise magnified or enhanced image of the visual data. This may help a driver of the vehicle 200 see pedestrians that are far away from the vehicle 200. Additionally or alternatively, the image of the pedestrian 320 within the interior visual information 33 can be highlighted or otherwise emphasized to assist a driver's identification of the pedestrian in low-light environments. The interior visual information 33 can also include a warning to the driver that a pedestrian 320 is ahead of the vehicle 200.

Now that the various potential systems, devices, elements and/or components of the dual-sided display system 100 have been described, various methods will now be described. Various possible steps of such methods will now be described. The methods described may be applicable to the arrangements described above in relation to FIGS. 1-4 as well as FIGS. 6-9 below, but it is understood that the methods can be carried out with other suitable systems and arrangements. Moreover, the methods may include other blocks that are not shown here, and in fact, the methods are not limited to including every block shown. The blocks that are illustrated here as part of the methods are not limited to the particular chronological order. Indeed, some of the blocks may be performed in a different order than what is shown and/or at least some of the blocks shown can occur simultaneously.

Referring now to FIG. 5, an example of a method 500 is shown. At block 510, exterior visual information 31 can be caused to be displayed on the exterior side of a window of a vehicle. The exterior visual information 31 can be a turning warning, a lane change warning, an accelerating warning, or a braking warning. The causing can be performed by the processor(s) 36 and/or the module(s) 38 (e.g., the display control module(s) 48). The method 500 can continue to block 510.

At block 510, interior visual information 33 can be caused to be displayed on the interior side of a window of a vehicle. The interior visual information 33 can include visual data of a portion of the exterior environment 240 of the vehicle. The causing can be performed by the processor(s) 36 and/or the module(s) 38 (e.g., the display control module(s) 48). The visual data can be acquired by the sensor(s) 14, such as the camera(s) 26. The method can then return to block 510 or proceed to some other block.

Referring now to FIGS. 6-9, three embodiments of the dual-sided transparent display 30 are shown. In some arrangements, the dual-sided transparent display 30 can be a dual-sided transparent display panel 30. The embodiments described below overcome three significant shortcomings of conventional dual-sided display panels, which are described below.

First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein can provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

FIG. 6 is a cross-sectional diagram a first embodiment of a dual-sided transparent display panel 30. This embodiment includes a first layer of electro-optic material 605a and a second layer of electro-optic material 605b, each of which has an inner surface (the surface closest to the axis of symmetry of the waveguide 610) and an outer surface (the surface farthest from the axis of symmetry just mentioned). As shown in FIG. 6, waveguide 610 is disposed between the inner surface of the first layer of electro-optic material 605a and the inner surface of the second layer of electro-optic material 605b. In some embodiments, waveguide 610 is made of glass.

Dual-sided transparent display panel 30 also includes a first grating coating 615a adjacent to the outer surface of the first layer of electro-optic material 605a and a second grating coating 615b adjacent to the outer surface of the second layer of electro-optic material 605b. In one embodiment, the first and second grating coatings (615a and 615b) are periodic grating coatings that include alternating diffusive and plain-glass regions.

Dual-sided transparent display panel 30 also includes light sources 625 along an edge of waveguide 610 that is perpendicular to the inner and outer surfaces of the first and second layers of electro-optic material (605a and 605b). In this embodiment, the light sources include red, green, and blue light sources in accordance with the RGB standard. In some embodiments, the light sources 625 are lasers. In other embodiments, the light sources 625 are light-emitting diodes (LEDs). In one embodiment, the LEDs are Micro-LEDs. In the coordinate system shown in FIG. 6, the light sources 625 are disposed along an edge of waveguide 610 that runs in the y direction (into and out of the page) and faces the negative z direction. In the embodiment shown in FIG. 6, dual-sided transparent display panel 30 is thus edge-lighted by light sources 625.

As diagramed in FIG. 6, light emitted from light sources 625 propagates along waveguide 610 in the z direction. In this embodiment, the first layer of electro-optic material 605a and the second layer of electro-optic material 605b can be, for example, an active liquid-crystal matrix or, in a different embodiment, a passive liquid-crystal matrix. In one embodiment, the first and second layers of electro-optic material (605a and 605b) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 6), the molecules of a liquid-crystal matrix can be caused to orient themselves in an "off" state or an "on" state. In FIG. 6, the vertical lines in first layer of electro-optic material 605a and second layer of electro-optic material 605b delineate the boundaries of rows or columns of pixels (in the y direction) in dual-sided transparent display panel 30.

Refer to the legend in FIG. 6 for the "on" and "off" states. Pixels with molecules oriented in the "off" (reflective) state 645 cause light such as the blue light 630 to be totally internally reflected within waveguide 610. The concept of total internal reflection (TIR) is well known in the waveguide-related art. As shown in FIG. 6, the oblong-shaped molecules oriented in the "off" state (645) are oriented substantially parallel to the z-axis (parallel to the direction in which light propagates within waveguide 610). Thus, a viewer looking at one of the sides of the dual-sided transparent display panel 30 in the positive or negative x direction would not see the blue light 630 at those pixel positions. Pixels with molecules oriented in the "on" (transmissive) state 640, on the other hand, are oriented at an angle relative to the z-axis, permitting light to exit waveguide 610, the blue light 630 mentioned earlier being diffused by first grating coating 615a to produce diffused and emitted blue light 635 that is visible to a user looking at dual-sided transparent display panel 30 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 30 (the side facing the positive x direction and the side facing the negative x direction) to permit different images to be displayed on the two opposite sides of dual-sided transparent display panel 30 simultaneously.

As shown in FIG. 6, dual-sided transparent display panel 30 also includes first light-blocking element 620a and second light-blocking element 620b. These light-blocking elements prevent light from leaking in the x direction from a predetermined portion (e.g., a rectangular strip) of dual-sided transparent display panel 30 adjacent to the edge of waveguide 610 (the perpendicular edge mentioned above) along which light sources 625 edge-light the display panel. In other words, the light-blocking elements 620a and 620b block light that is not totally internally reflected near the edge of the waveguide 610 closest to the light sources 625. In variations of the first embodiment (the embodiment shown in FIG. 6), a different type of electro-optic material other than a liquid-crystal matrix can be used.

Figure 7A:
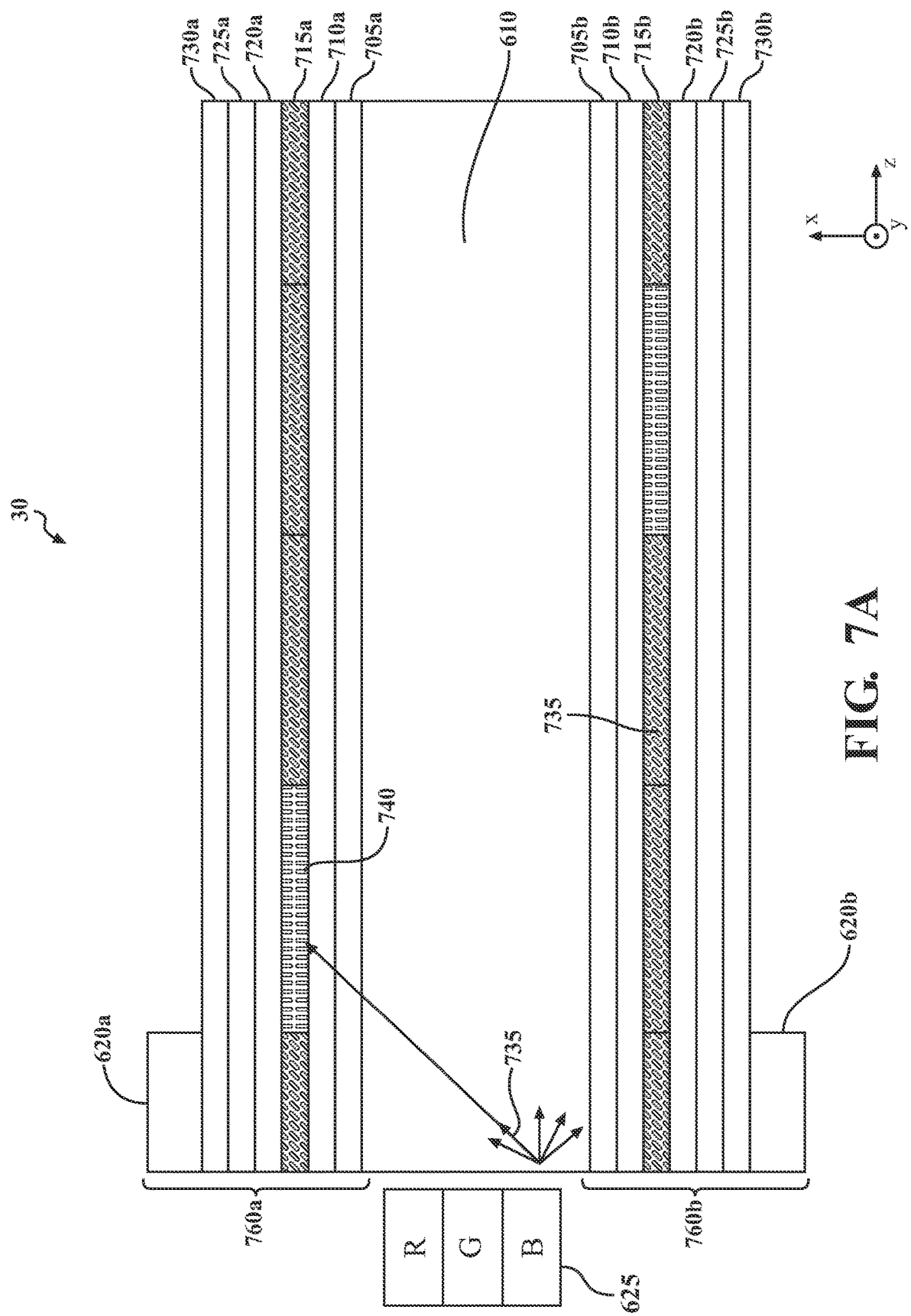
FIGS. 7A and 7B are an example of a second embodiment of a dual-sided transparent display that can be used in connection with the dual-sided display system.

FIG. 7A is a cross-sectional diagram of a second embodiment of a dual-sided transparent display panel 30 in an illustrative molecular configuration of the liquid-crystal matrices. In this embodiment, the first and second grating coatings 615a and 615b in the embodiment of FIG. 6 are omitted, and other layers are added to each side of the overall display panel. In this embodiment, the liquid-crystal matrices themselves are capable of scattering/diffusing light, eliminating the need for the grating coatings.

The two sides of dual-sided transparent display panel 30 may be thought of as separate panel subassemblies. A first panel subassembly 760a of dual-sided transparent display panel 30 includes a plurality of adjacent layers. Those layers, moving from the innermost layer to the outermost layer (relative to the axis of symmetry of waveguide 610) include a first electrode layer 705a, a first polyimide layer 710a, a liquid-crystal matrix 715a, a second polyimide layer 720a, a second electrode layer 725a, and a glass layer 730a. The polyimide layers (710a and 720a) are used to place the liquid-crystal molecules in the desired orientation, when they are in their passive (default) state. The specific orientations of the molecules are discussed in greater detail below. In some embodiments, the electrode layers (705a, 725a) include Indium Tin Oxide (ITO).

A second panel subassembly 760b of dual-sided transparent display panel 30 includes a plurality of adjacent layers that correspond to those in the first panel subassembly 760a. Those layers, moving from the innermost layer to the outermost layer (relative to the axis of symmetry of waveguide 610), include a first electrode layer 705b, a first polyimide layer 710b; a liquid-crystal matrix 715b; a second polyimide layer 720b; a second electrode layer 725b, and a glass layer 730b. As mentioned above, in some embodiments, the electrode layers (705b, 725b) include Indium Tin Oxide (ITO).

In this embodiment, a waveguide 610 is disposed between the inner surface of the first electrode layer 705a of the first panel subassembly 760a and the inner surface of the first electrode layer 705b of the second panel subassembly 760b. In some embodiments, waveguide 610 is made of glass, as in the embodiment shown in FIG. 6.

Dual-sided transparent display panel 30 also includes light sources 625 along an edge of waveguide 610 that is perpendicular to the inner surface of the first electrode layer 705a of the first panel subassembly 760a and the inner surface of the first electrode layer 705b of the second panel subassembly 760b. In this embodiment, the light sources include RGB light sources. In some embodiments, the light sources 625 are lasers. In other embodiments, the light sources 625 are light-emitting diodes (LEDs). In the coordinate system shown in FIG. 7A, the light sources 625 are disposed along an edge of waveguide 610 that runs in they direction (into and out of the page) and faces the negative z direction. In the embodiment shown in FIG. 7A, dual-sided transparent display panel 30 is thus edge-lighted by light sources 625.

In some embodiments, the liquid-crystal matrix in each of the panel subassemblies (760a and 760b) includes nematic liquid crystals. Refer to the legend for the "on" and "off" states in FIG. 7A. As depicted in FIG. 7A, the oblong-shaped molecules making up the nematic liquid crystals can be oriented at an angle (less than 90 degrees) relative to the positive z-axis, when in the passive or "off" state (see molecules oriented in the "off" state 745 in FIG. 7A). When the oblong-shaped molecules are in the "on" state, they are aligned approximately perpendicularly to waveguide 610 (see molecules oriented in the "on" state 740 in FIG. 3A). In the illustrative configuration of the molecules depicted in FIG. 7A, blue light 735 reaches a pixel for which the molecules are in the "on" state (740), which permits the blue light 735 to exit the first panel subassembly 760a in the positive x direction, making it visible to a user gazing toward dual-sided transparent display panel 30 in the negative x direction.

As shown in FIG. 7A, dual-sided transparent display panel 30 also includes first light-blocking element 620a and second light-blocking element 620b. These light-blocking elements prevent light from leaking in the x direction from a predetermined portion (e.g., a rectangular strip) of dual-sided transparent display panel 30 adjacent to the edge of waveguide 610 that is perpendicular to the inner surface of the first electrode layer 705a of the first panel subassembly 760a and the inner surface of the first electrode layer 705b of the second panel subassembly 760b— the edge of waveguide 610 along which light sources 625 edge-light the display panel. In other words, the light-blocking elements 620a and 620b block light that is not totally internally reflected near the edge of the waveguide 610 closest to the light sources 625.

Figure 7B:
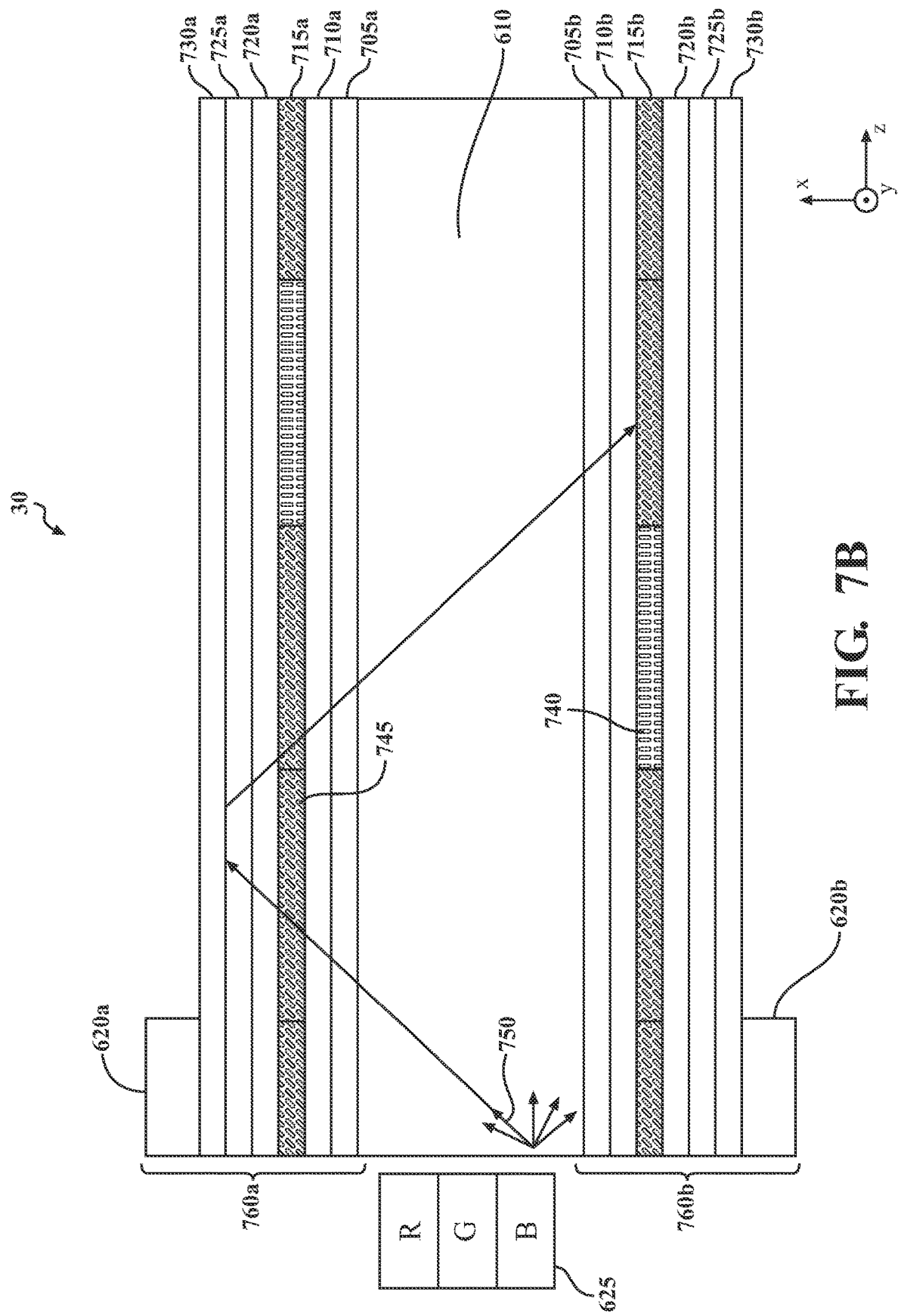

FIG. 7B is a cross-sectional diagram of a second embodiment of a dual-sided transparent display panel 30 in another illustrative molecular configuration of the liquid-crystal matrices. Refer to the legend for the "on" and "off" states in FIG. 7B. In this example, green light 750 encounters molecules in the liquid-crystal matrix 715a of the first panel subassembly 760a that are oriented in the "off" state (see molecules oriented in "off" state 745 in FIG. 3B). The orientation of those molecules (745) permits the green light 750 to propagate beyond liquid-crystal matrix 715a but causes the green light 750 to nevertheless be reflected within first panel subassembly 760a as if the dimensions of waveguide 610 were effectively expanded to encompass, e.g., the glass layer 730a of first panel subassembly 760a, as depicted in FIG. 3B. Thus, the molecules in a given panel subassembly (760a or 760b) that are oriented in the "off" state cause light from light sources 625 to be reflected by that panel subassembly toward the waveguide 610 instead of exiting that panel subassembly.

Before discussing a third embodiment of a dual-sided transparent display panel shown in FIG. 9, FIGS. 8A and 8B will be discussed to introduce some of the important principles underlying the embodiment in FIG. 9. FIG. 8A is a diagram of beam splitting using circular polarization when the molecules of a liquid-crystal substance are oriented in an "off" state, in connection with a third embodiment of a dual-sided transparent display panel. In FIG. 8A, light with two opposite circular polarizations, counterclockwise-polarized light 820 and clockwise-polarized light 825, enters a nematic liquid-crystal substance 805. In FIG. 8A, the molecules 810 are oriented in the "off" state. This causes the counterclockwise-polarized light 820 to be diverted in the negative x direction (directed light 830) and the clockwise-polarized light 825 to be diverted in the opposite (positive x) direction (directed light 835). With the molecules in this "off" configuration and the incoming light being polarized in opposite senses (clockwise and counterclockwise or right-handed and left-handed, respectively), the nematic liquid-crystal substance 805 effectively acts as a beam splitter to direct light toward the separate sides of a dual-sided transparent display panel, depending on how the incoming light is polarized. In other words, an arrangement such as that shown in FIG. 8A exploits the chirality (or handedness) of the liquid-crystal molecules' effect on circularly polarized light, when the molecules are oriented in the "off" state.

FIG. 8B is a diagram of light passing through a liquid-crystal substance when the molecules are in an orientation corresponding to an "on" state, in connection with a third embodiment of a dual-sided transparent display panel. As shown in FIG. 8B, entering light 840 passes through nematic liquid-crystal substance 805 (see exiting light 845 in FIG. 8B) without being diverted by molecules 815 that are oriented in the "on" state. Such light will not be visible to a user looking at either side of the dual-sided transparent display panel.

FIG. 9 is a cross-sectional diagram of a third embodiment of a dual-sided transparent display panel 30. A first panel subassembly 935a of dual-sided transparent display panel 30 includes a plurality of adjacent layers. Those layers, moving from the innermost layer to the outermost layer (relative to the axis of symmetry of a nematic liquid-crystal layer 920 that acts as a waveguide) include a polyimide alignment layer 905a, an electrode layer 910a, and a glass layer 915a.

A second panel subassembly 935b of dual-sided transparent display panel 30 includes a plurality of layers that correspond to those in first panel subassembly 935a. Those layers, moving from the innermost layer to the outermost layer (relative to the axis of symmetry of nematic liquid-crystal layer 920) include a polyimide alignment layer 905b, an electrode layer 910b, and a glass layer 915b. In some embodiments, the electrode layers (910a and 910b) in the two panel subassemblies include Indium Tin Oxide (ITO).

As shown in FIG. 9, nematic liquid-crystal layer 920 is disposed between the inner surface of the polyimide alignment layer 905a of the first panel subassembly 935a and the inner surface of the polyimide alignment layer 905b of the second panel subassembly 935b. In a different embodiment, cholesteric liquid crystals are used instead of nematic liquid crystals. As discussed above, this layer acts as a waveguide with reorientable molecules within it (refer to the discussion of FIGS. 8A and 8B above) that direct, toward the glass layer 915a of the first panel subassembly 935a, light 925 from one or more light sources that is circularly polarized in a first sense and that direct, toward the glass layer 915b of the second panel subassembly, light 925 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 9, the light sources for edge-lighting of the dual-sided transparent display panel can be similar, in this embodiment, to those discussed above in connection with FIGS. 6, 7A, and 7B (the first and second embodiments). In some variations of the embodiment shown in FIG. 9, a different type of liquid-crystal layer other than a nematic liquid-crystal layer can be employed.

In the embodiment shown in FIG. 9, the nematic liquid-crystal layer 920 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 920 from one or more light sources, such as the light sources 625 shown in FIGS. 6, 7A, and 7B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 625. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Further, it will be appreciated that the above-described embodiments of the dual-sided transparent display are not the only configurations that can be used. Indeed, additional examples of the dual-sided transparent display can include any of those disclosed in U.S. patent application Ser. No. 16/897,577 which is incorporated herein by reference in its entirety.

It will be appreciated that arrangements described herein can provide numerous benefits, including one or more of the benefits mentioned herein. For example, the arrangements described herein can provide a dual-sided display system to replace traditional side view mirrors on a vehicle. Thus, the aerodynamics of the vehicle and driver visibility of the exterior environment can be improved. The arrangements described herein can also provide a dual-sided display system for a window of a vehicle for displaying warnings and/or signals to an adjacent entity near a vehicle as well as warnings and/or signals to a driver or other occupant of the vehicle. The warnings and/or signals can indicate to the adjacent entity that the actions of the vehicle, such as if the vehicle is turning, making a lane change, accelerating, or braking. The warnings and/or signals can indicate to a driver or other occupant of the vehicle that an adjacent entity is located near the vehicle. Moreover, the arrangements described herein can allow the driver to view the exterior environment of the vehicle without turning his or her head. The arrangements described herein can thus create a safer driving environment for the driver and adjacent entities near the vehicle. The arrangements described herein can be implemented without affecting visibility through the window.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

The systems, components, and/or processes described above can be realized in hardware or a combination of hardware and software and can be realized in a centralized fashion in one processing system or in a distrusted fashion where different elements are spread across several interconnected processing systems. Any kind of processing system or other apparatus adapted for carrying out the methods described herein is suitable. A typical combination of hardware and software can be a processing system with computer-useable program code that, when being loaded and executed, controls the processing system such that it carries out the methods described herein. The systems, components, and/or processes can also be embedded in a computer-readable storage, such as a computer program product or other data programs storage device, readable by a machine, tangibly embodying a program of instructions executable by the machine to perform methods and processes described herein. These elements can also be embedded in an application product which comprises all the features enabling the implementation of the methods described herein and which, when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle, comprising:
    a window including an interior side and an exterior side;
    at least one camera operatively positioned to capture visual data of a portion of an exterior environment of the vehicle;
    a dual-sided transparent display forming at least a portion of the window; and
    a processor operatively connected to the camera and the dual-sided transparent display, the processor being configured to:
        selectively cause the dual-sided transparent display to display exterior visual information on the exterior side; and
        selectively cause the dual-sided transparent display to display interior visual information on the interior side, the interior visual information including the visual data of the portion of the exterior environment of the vehicle, the dual-sided transparent display being configured to simultaneously display the exterior visual information and interior visual information independently without occlusion.

2. The vehicle of claim 1, wherein the dual-sided transparent display includes:
    a waveguide;
    layers of electro-optic material disposed exterior to the waveguide, the layers of electro-optic material being liquid crystal matrix; and
    grating coatings disposed exterior to the layers of electro-optic material and the waveguide.

3. The vehicle of claim 1, The vehicle of claim 1, wherein the interior visual information is not visible on the exterior side, and wherein the exterior visual information is not visible on the interior side.

4. The vehicle of claim 1, wherein the at least one camera is at least one of a wide-angle camera, a fish-eye camera, an infrared camera, a thermal camera, and a camera modified with a lens of a different focal length.

5. The vehicle of claim 1, wherein the camera is substantially flush with or recessed from an exterior of the vehicle, whereby the at least one camera does not increase an exterior envelope of the vehicle.

6. The vehicle of claim 1, further comprising:
at least one sensor located on an exterior of the vehicle, wherein the at least one sensor is operatively connected to the processor, wherein the at least one sensor is configured to acquire environment data, and wherein the processor is further configured to detect, using the environment data, an adjacent entity located in the portion of the exterior environment of the vehicle.

7. The vehicle of claim 6, wherein at least one of selectively cause the dual-sided transparent display to display exterior visual information on the exterior side and selectively cause the dual-sided transparent display to display interior visual information on the interior side is responsive to detecting the adjacent entity located in the portion of the exterior environment of the vehicle.

8. The vehicle of claim 6, wherein the adjacent entity is at least one of an adjacent vehicle, an adjacent pedestrian, and an adjacent biker.

9. The vehicle of claim 1, wherein the exterior visual information is at least one of a turning warning and a lane change warning displayed when a turn signal of the vehicle is activated.

10. The vehicle of claim 1, wherein the exterior visual information is an accelerating warning displayed when the vehicle is accelerating.

11. The vehicle of claim 1, wherein the exterior visual information is a braking warning displayed when the vehicle is braking.

12. The vehicle of claim 1, wherein the window is a driver's side window, wherein the at least one camera is a first camera operatively positioned to capture visual data of a portion of a driver's side exterior environment of the vehicle, wherein the dual-sided transparent display is a first dual-sided transparent display forming at least a portion of the driver's side window, wherein the processor is configured to:
selectively cause the dual-sided transparent display to display driver's side exterior visual information on the exterior side; and
selectively cause the dual-sided transparent display to display driver's side interior visual information on the interior side, wherein the driver's side interior visual information includes the visual data of the portion of the driver's side exterior environment of the vehicle.

13. A vehicle comprising:
a window including an interior side and an exterior side;
at least one camera operatively positioned to capture visual data of a portion of an exterior environment of the vehicle;
a dual-sided transparent display forming at least a portion of the window;
a processor operatively connected to the camera and the dual-sided transparent display and configured to selectively cause the dual-sided transparent display to display exterior visual information on the exterior side, the processor further configured to selectively cause the dual-sided transparent display to display interior visual information on the interior side, the interior visual information including the visual data of the portion of the exterior environment of the vehicle; and
a gaze detector located in a passenger compartment of the vehicle, the gaze detector being operatively connected to the processor, the gaze detector being configured to detect when a driver of the vehicle is looking toward a pedestrian, and
at least one of selectively cause the dual-sided transparent display to display exterior visual information on the exterior side and selectively cause the dual-sided transparent display to display interior visual information on the interior side is responsive to the gaze detector detecting that the driver is looking toward a pedestrian.

14. A vehicle comprising:
a window including an interior side and an exterior side;
at least one camera operatively positioned to capture visual data of a portion of an exterior environment of the vehicle;
a dual-sided transparent display forming at least a portion of the window;
a processor operatively connected to the camera and the dual-sided transparent display and configured to selectively cause the dual-sided transparent display to display exterior visual information on the exterior side, the processor further configured to selectively cause the dual-sided transparent display to display interior visual information on the interior side, the interior visual information including the visual data of the portion of the exterior environment of the vehicle; and
a gaze detector located in a passenger compartment of the vehicle, the gaze detector being operatively connected to the processor, the gaze detector being configured to detect a line of sight of a driver of the vehicle, and the processor being configured to cause a location of the interior visual information displayed on the dual-sided transparent display to move based on the line of sight of the driver.

15. A vehicle comprising:
a driver's side window including an interior side and an exterior side;
a passenger's side window including an interior side and an exterior side;
a first camera operatively positioned to capture visual data of a portion of a driver's side exterior environment of the vehicle;
a second camera operatively positioned to capture visual data of a portion of a passenger's side exterior environment of the vehicle;
a first dual-sided transparent display forming at least a portion of the driver's side window;
a second dual-sided transparent display forming at least a portion of the passenger's side window;
a processor operatively connected to the first camera, the second camera, the first dual-sided transparent display, and the second dual-sided transparent display and configured to:
selectively cause the first dual-sided transparent display to display driver's side exterior visual information on the exterior side;
selectively cause the first dual-sided transparent display to display driver's side interior visual information on the interior side, the driver's side interior visual information including the visual data of the portion of the driver's side exterior environment of the vehicle; and
selectively cause the second dual-sided transparent display to display passenger's side exterior visual information on the exterior side; and
selectively cause the second dual-sided transparent display to display passenger's side interior visual information on the interior side, the passenger's side interior visual information including the visual data of the passenger's side exterior environment of the vehicle.

16. The vehicle of claim 15, wherein the driver's side interior visual information and the passenger's side interior visual information are displayed continuously while the vehicle is in operation.

17. A method for a vehicle, the vehicle including a window, the window including an interior side and an exterior side, a camera operatively positioned to capture visual data of a portion of an exterior environment of the vehicle, and a dual-sided transparent display forming at least a portion of the window, the method comprising:
  causing exterior visual information to be displayed on the exterior side; and
  causing interior visual information to be displayed on the interior side, the interior visual information including the visual data of the portion of the exterior environment of the vehicle, wherein causing the exterior visual information to be displayed on the exterior side and causing the interior visual information to be displayed on the interior side are performed simultaneously and independently without occlusion.

18. The method of claim 17, further comprising:
  detecting an adjacent entity located in the portion of the exterior environment of the vehicle, wherein causing the exterior visual information to be displayed on the exterior side is responsive to detecting the adjacent entity located in the portion of the exterior environment of the vehicle.

19. The method of claim 17, wherein the exterior visual information is not visible on the interior side, and wherein the interior visual information is not visible on the exterior side.

* * * * *

UNITED STATES PATENT AND TRADEMARK OFFICE
CERTIFICATE OF CORRECTION

PATENT NO. : 12,030,382 B2
APPLICATION NO. : 17/348254
DATED : July 9, 2024
INVENTOR(S) : Rodrigues et al.

It is certified that error appears in the above-identified patent and that said Letters Patent is hereby corrected as shown below:

In the Specification

Column 18, Line 58: replace "refractive indices, n e (extraordinary) and n, (ordinary)," with --refractive indices, $n_e$ (extraordinary) and $n_o$ (ordinary),--

Column 20, Lines 28-29: replace "runs in they direction" with --runs in the y direction--

In the Claims

Claim 3, Column 24, Line 62: replace "The vehicle of claim 1, The vehicle of claim 1," with --The vehicle of claim 1,--

Signed and Sealed this
Twenty-second Day of October, 2024

Katherine Kelly Vidal
*Director of the United States Patent and Trademark Office*